(12) United States Patent
Banning et al.

(10) Patent No.: US 7,812,140 B2
(45) Date of Patent: Oct. 12, 2010

(54) COLORANT COMPOUNDS

(75) Inventors: Jeffrey H. Banning, Hillsboro, OR (US); James D. Mayo, Mississauga (CA); Rina Carlini, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 11/732,796

(22) Filed: Apr. 4, 2007

(65) Prior Publication Data

US 2008/0249290 A1 Oct. 9, 2008

(51) Int. Cl.
*C09B 29/03* (2006.01)
*C09B 29/46* (2006.01)

(52) U.S. Cl. .................. 534/649; 534/792
(58) Field of Classification Search .......... None
See application file for complete search history.

(56) References Cited

U.S. PATENT DOCUMENTS

| | | | | |
|---|---|---|---|---|
| 1,600,277 | A | | 9/1926 | Ellis et al. .............. 8/529 |
| 1,822,044 | A | * | 9/1931 | Krzikalla et al. ........... 534/785 |
| 2,681,338 | A | * | 6/1954 | Harrison et al. ............. 534/792 |
| 2,714,587 | A | | 8/1955 | Reinhard et al. ........... 534/690 |
| 2,773,055 | A | * | 12/1956 | Hindermann et al. ....... 534/651 |
| 2,888,452 | A | * | 5/1959 | Schmid et al. ............ 534/651 |
| 3,403,966 | A | * | 10/1968 | Itoh et al. ................. 8/692 |
| 3,653,932 | A | | 4/1972 | Berry et al. ............. 106/31.29 |
| 4,305,718 | A | * | 12/1981 | Loffler et al. ............... 8/532 |
| 4,390,369 | A | | 6/1983 | Merritt et al. ............. 106/31.3 |

(Continued)

FOREIGN PATENT DOCUMENTS

| | | |
|---|---|---|
| EP | 0187352 | 7/1986 |
| EP | 0206286 | 12/1986 |
| EP | 0218206 | 4/1987 |
| EP | 0449650 | 10/1991 |
| EP | 0638620 | 2/1995 |
| EP | 1375599 | 1/2004 |
| EP | 1630204 | 3/2006 |
| JP | 62295973 | 12/1987 |
| WO | WO 94/04619 | 3/1994 |

OTHER PUBLICATIONS

Kraska et al., Chemical Abstracts, 100:211618, 1984.*
Chemical Abstracts Registry No. 452318-56-8, entered into Registry file on STN on Sep. 18, 2002.*
Chemical Abstracts Registry No. 392672-55-8, entered into Registry file on STN on Feb. 15, 2002.*
Chemical Abstracts Registry No. 314291-31-1, entered into Registry file on STN on Jan. 17, 2001.*
English Abstract for German Patent Publication DE 4205636AL, Aug. 1993.
English Abstract for German Patent Publication DE 4205713AL, Mar. 1996.

U.S. Patent Application filed Apr. 4, 2007, of Jeffrey Banning et al., entitled "Phase Change Inks Containing Colorant Compounds" 95 pages, not yet published.
U.S. Patent Application filed Apr. 4, 2007, of Jeffrey Banning et al., entitled "Colorant Compounds" 89 pages, not yet published.
U.S. Patent Application filed Apr. 4, 2007, of Jeffrey Banning, entitled "Phase Change Inks Containing Colorant Compounds" 100 pages, not yet published.

(Continued)

*Primary Examiner*—Fiona T Powers
(74) *Attorney, Agent, or Firm*—Marylou J. Lavoie, Esq. LLC

(57) ABSTRACT

Disclosed is a compound of the formula

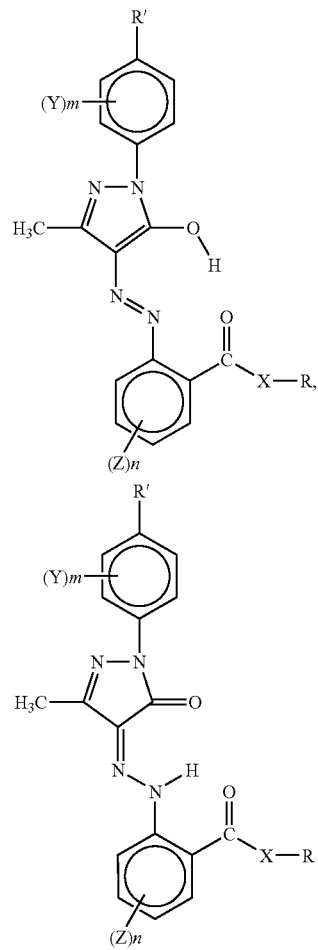

and dimers thereof, wherein R, R', X, $(Y)_m$, and $(Z)_n$ are as defined herein. The compounds are useful as colorants, particularly in applications such as phase change inks.

12 Claims, No Drawings

U.S. PATENT DOCUMENTS

| | | | | |
|---|---|---|---|---|
| 4,484,948 | A | 11/1984 | Merritt et al. | 106/31.3 |
| 4,658,064 | A | 4/1987 | Moore et al. | 564/443 |
| 4,684,956 | A | 8/1987 | Ball | 347/88 |
| 4,851,045 | A | 7/1989 | Taniguchi | 106/31.31 |
| 4,889,560 | A | 12/1989 | Jaeger et al. | 106/31.29 |
| 4,889,761 | A | 12/1989 | Titterington et al. | 428/32.1 |
| 4,965,345 | A * | 10/1990 | Loeffler | 534/651 |
| 5,006,170 | A | 4/1991 | Schwarz et al. | 106/31.3 |
| 5,013,857 | A | 5/1991 | Berneth et al. | 552/110 |
| 5,151,120 | A | 9/1992 | You et al. | 106/31.29 |
| 5,221,335 | A | 6/1993 | Williams et al. | 524/560 |
| 5,372,852 | A | 12/1994 | Titterington et al. | 427/288 |
| 5,496,879 | A | 3/1996 | Griebel et al. | 524/320 |
| 5,621,022 | A | 4/1997 | Jaeger et al. | 523/161 |
| 5,782,966 | A | 7/1998 | Bui et al. | 106/31.43 |
| 6,045,607 | A | 4/2000 | Breton et al. | 106/31.29 |
| 6,174,937 | B1 | 1/2001 | Banning et al. | 523/160 |
| 6,309,453 | B1 | 10/2001 | Banning et al. | 106/31.29 |
| 6,576,747 | B1 | 6/2003 | Carlini et al. | 534/649 |
| 6,576,748 | B1 | 6/2003 | Carlini et al. | 534/649 |
| 6,590,082 | B1 | 7/2003 | Banning et al. | 534/649 |
| 6,642,265 | B1 * | 11/2003 | Luengo et al. | 514/407 |
| 6,646,111 | B1 | 11/2003 | Carlini et al. | 534/649 |
| 6,663,703 | B1 | 12/2003 | Wu et al. | 106/31.29 |
| 6,673,139 | B1 | 1/2004 | Wu et al. | 106/31.29 |
| 6,696,552 | B2 | 2/2004 | Mayo et al. | 534/649 |
| 6,713,614 | B2 | 3/2004 | Carlini et al. | 534/649 |
| 6,755,902 | B2 | 6/2004 | Banning et al. | 106/31.29 |
| 7,034,185 | B2 | 4/2006 | Banning et al. | 564/443 |
| 2006/0110430 | A1 | 5/2006 | Pearson et al. | 424/428 |

OTHER PUBLICATIONS

Jerry March, Advanced Organic Chemistry: Reactions, Mechanisms and Structure, $2^{nd}$ Edition, ISBN 0-07-040247-7, 1977, McGraw Hill, Inc., p. 825.

European Search Report, European Patent Application No. EP 08102203.0-2103 ./ 1984667, dated Oct. 8, 2008, 6 pages.

EP 62294973, Patent Abstracts of Japan, Owatari Akio, Published Dec. 23, 1987, 1 page.

L.P. Kulev et al., Pyrazolone monoazo dyes, Chemical Abstracts, vo. 58, No. 6, 1963, XP002495001, abstract, 1 page.

D.G. McMinn et al., "Studies of Reagents for spectrophotometric measurement of Ionic Magnesium," Can. J. Chem., vol. 55, 1977, pp. 3909-3914, XP00249500.

R. Karlicek et al., "Darstellung und Eigenschaften von Azovergindungen mit funktioneller Karbohydroxamgruppe," Chemicke Zvesti, vol. 34, No. 4, 1981, pp. 491-499, XP002494998.

P. F. King et al., "Mild Homogeneous Deblocking employing 2-Bromo-1,3,2-Benzodioxaborole," Tetrahedron Lett., vol. 25, No. 11, 1985, pp. 1415-1418, XP002494999.

* cited by examiner

COLORANT COMPOUNDS

Cross-reference is made to the following co-pending applications:

Co-pending application U.S. Ser. No. 11/732,795, filed concurrently herewith, entitled "Phase Change Inks Containing Colorant Compounds," with the named inventor Jeffery H. Banning, the disclosure of which is totally incorporated herein by reference, discloses in embodiments a phase change ink composition comprising a phase change ink carrier and a dimeric colorant compound.

Co-pending application U.S. Ser. No. 11/732,754, filed concurrently herewith, entitled "Colorant Compounds," with the named inventors Jeffery H. Banning, et at., the disclosure of which is totally incorporated herein by reference, discloses compounds of the formula

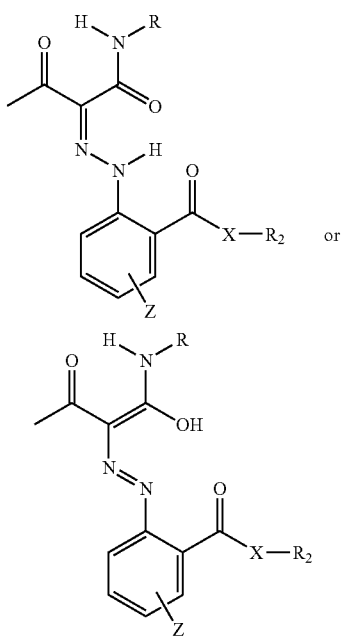

and dimers thereof.

Co-pending application U.S. Ser. No. 11/732,811, filed concurrently herewith, entitled "Phase Change Ink Containing Colorant Compounds," with the named inventors Jeffery H. Banning, et al., the disclosure of which is totally incorporated herein by reference, discloses a phase change ink composition comprising a phase change ink carrier and a colorant compound.

BACKGROUND

The present disclosure is generally related to colorant compounds. More specifically, the present disclosure is directed to colorant compounds particularly suitable for use in hot melt or phase change inks. In embodiments, the present disclosure is directed to dimeric azo pyrazolone colorant compounds particularly suitable for use in hot melt or phase inks. One embodiment of the present disclosure is directed to a compound of the formula

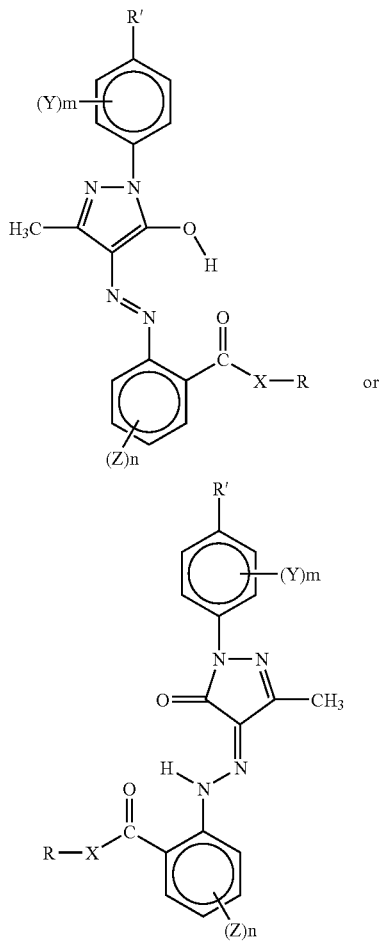

and dimers thereof, wherein R and R' are each independently selected from (i) an alkyl group, (ii) an alkylene group, (iii) an arylene group, (iv) an arylalkylene group, (v) an alkylarylene group, (vi) an alkyleneoxy group, (vii) an aryleneoxy group, (viii) an arylalkyleneoxy group, (ix) an alkylaryleneoxy group, (x) a polyalkyleneoxy group, (xi) a polyaryleneoxy group, (xii) a polyarylalkyleneoxy group, (xiii) a polyalkylaryleneoxy group, (xiv) a heterocyclic group, (xv) a silylene group, (xvi) a siloxane group, (xvii) a polysilylene group, (xviii) a polysiloxane group, or (xix) hydrogen, provided both R and R' cannot be hydrogen; and wherein X is a (i) direct bond, (ii) an oxygen atom, (iii) a nitrogen atom, (iv) a sulfur atom, (v) a group of the formula —$NR_{40}$— wherein $R_{40}$ is a hydrogen atom, an alkyl group, an aryl group, an arylalkyl group, or an alkylaryl group, (vi) or a group of the formula —$CR_{50}R_{60}$—; wherein $R_{50}$ and $R_{60}$ each, independently of the other, is a hydrogen atom, an alkyl group, an aryl group, an arylalkyl group, or an alkylaryl group; and wherein $(Y)_m$ and $(Z)_n$ are each independently optionally present and wherein $(Y)_m$ and $(Z)_n$ are each independently selected from i) a hydrogen atom, (ii) a halogen atom, (iii) a nitro group, (iv) an alkyl group, (v) an aryl group, (vi) an arylalkyl group, (vii) an alkylaryl group, (viii) a group of the formula

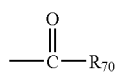

wherein $R_{70}$ is an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, (ix) a sulfonyl group of the formula —SO$_2$R$_{80}$ wherein R$_{80}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, or (x) a phosphoryl group of the formula —PO$_3$R$_{90}$ wherein R$_{90}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group.

and in (Y)m, m is an integer from about 0 to about 4, or about 1 to about 3, or about 1 to 2, and in (Z)n, n is an integer from about 0 to about 4, or about 1 to about 3, or about 2 to about 3.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosure of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labeling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that the migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT patent application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 6,576,747 of Rina Carlini et al., entitled "Processes for Preparing Dianthranilate Compounds and Diazopyridone Colorants," which is hereby incorporated by reference herein in its entirety, discloses a process for preparing dianthranilate compounds which comprises (a) admixing reactants as follows: (1) a diol of the formula R1(OH)2, wherein R1 is an alkylene group having at least about 20 carbon atoms, and wherein the —OH groups are primary of secondary, (2) isatoic anhydride, present in an amount of at least about 2 moles of isatoic anhydride per every one mole of diol, (3) a catalyst which is 1,4-diazabicyclo[2,2,2]octane, N,N,N',N'-tetramethylethylene diamine, or a mixture thereof, said catalyst being present in an amount of at least about 0.2 mole of catalyst per every one mole of diol, and (4) a solvent; and (b) heating the mixture thus formed to form a dianthranilate compound of the formula

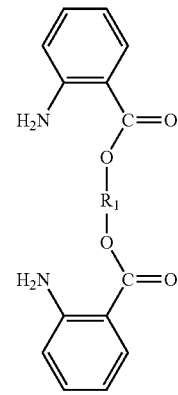

Also disclosed is a process for preparing diazopyridone colorants which comprises (I) preparing a dianthranilate compound by the aforementioned method, (II) reacting the dianthranilate compound with nitrosylsulfuric acid to from a diazonium salt, and (III) reacting the diazonium salt with a pyridine compound to form a diazopyridone compound.

U.S. Pat. No. 6,713,614 of Rina Carlini et al., entitled "Dimeric Azo Pyridone Colorants," which is hereby incorporated by reference herein in its entirety, discloses compounds of the formula

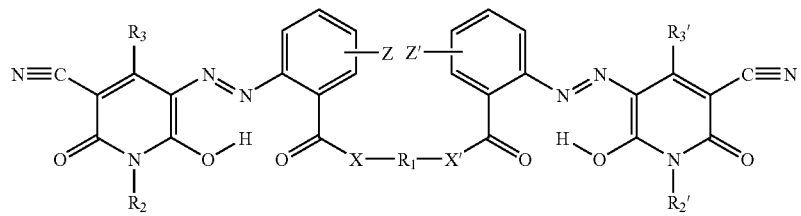

The compounds are useful as colorants, particularly in application such as phase change inks.

U.S. Pat. No. 6,663,703 or Bo Wu et al., entitled "Phase Change Inks Containing Dimeric Azo Pyridone Colorants," which is hereby incorporated by reference herein in its entirety, discloses a phase change ink composition comprising a phase change ink carrier and a colorant compound of the formula

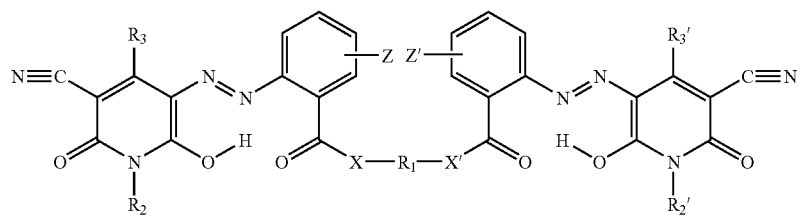

U.S. Pat. No. 6,755,902 Patent of Jeffery H. Banning et al. entitled "Phase Change Inks Containing Azo Pyridone Colorants" which is hereby incorporated by reference herein in its entirety, discloses a phase change ink composition comprising a phase change ink carrier and a colorant compound of the formula

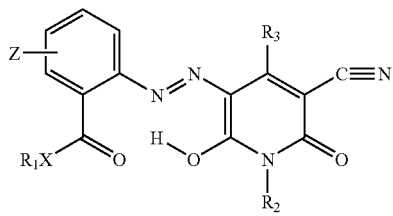

U.S. Pat. No. 6,590,082 of Jeffery H. Banning et al. entitled "Azo Pyridone Colorants," which is hereby incorporated by reference herein in its entirety, discloses compounds of the formula

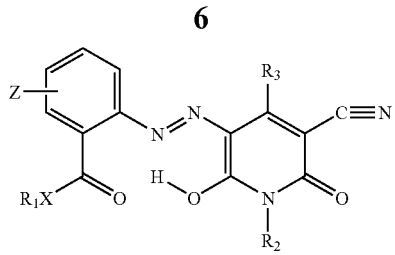

The compounds are useful as colorants, particularly in applications such as phase change inks.

U.S. Pat. No. 9,696,522 of James D. Mayo et al. entitled "Process for Preparing Substituted Pyridone Compounds," which is hereby incorporated by reference herein in its entirety, discloses a process for preparing substituted pyridone compounds which comprises (a) admixing in the absence of a solvent (1) an amine of the formula $R1\text{-}NH_2$ wherein R1 is an alkyl group, an aryl group, an arylalkyl group, or an alkylaryl group, and (2) a first ester of the formula

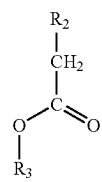

wherein $R_2$ is an electron withdrawing group and $R_3$ is an alkyl group; (b) heating the mixture containing the amine and the first ester to form an intermediate compound of the formula

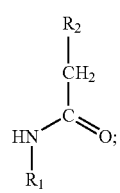

(c) admixing the intermediate compound with (1) a base and (2) a second ester of the formula

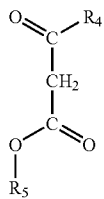

wherein $R_4$ is an alkyl group, an aryl group, an arylalkyl group, or an alkylaryl group and $R_5$ is an alkyl group, said second ester being present in a molar excess relative to the intermediate compound, said base being present in a molar excess relative to the intermediate compound, and (d) heating the mixture containing the intermediate compound, the second ester, and the base to form a pyridone compound of the formula

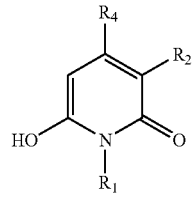

or a salt thereof. Also disclosed is a process for preparing diazopyridone colorants which comprises preparing a pyridone compound by the above process and reacting the pyridone compound with a diazonium salt to form a diazopyridone compound.

U.S. Pat. No. 6,576,748 of Rina Carlini et al. entitled "Method for Making Dimeric Azo Pyridone Colorants," which is hereby incorporated by reference herein in its entirety, discloses a process for preparing a diazopyridone compound which comprises (a) preparing a first solution comprising (1) either (A) a dianiline of the formula

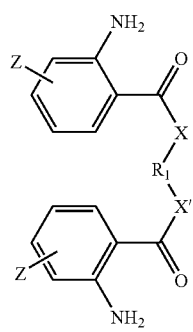

or (B) an aniline of the formula

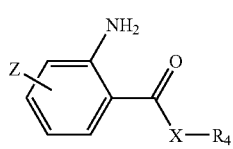

and (2) a first solvent mixture comprising (I) a solvent, (II) acetic acid, and (III) and optional second acid, said acetic acid being present in the solvent mixture in an amount of at least about 95 percent by weight of the solvent mixture, said first solution being at a temperature of about +15° C. or lower; (b) adding to the first solution nitrosylsulfuric acid, thereby forming a diazonium salt either (A) of the formula

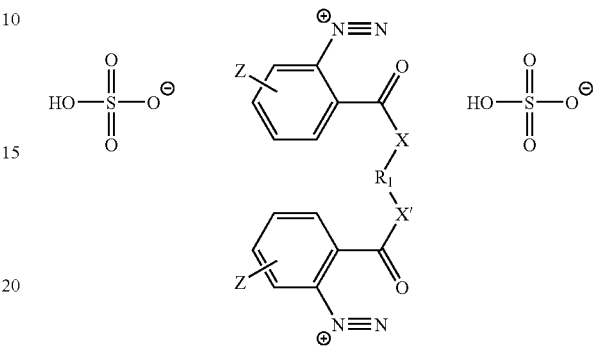

or (B) of the formula

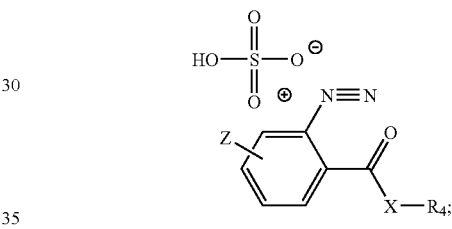

(c) preparing a second solution comprising (1) a second solvent mixture comprising water and an organic solvent soluble in or miscible in water, (2) either (A) a pyridone of the formula

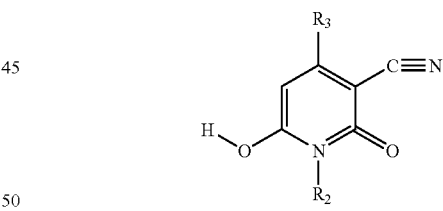

or (B) a dipyridone of the formula

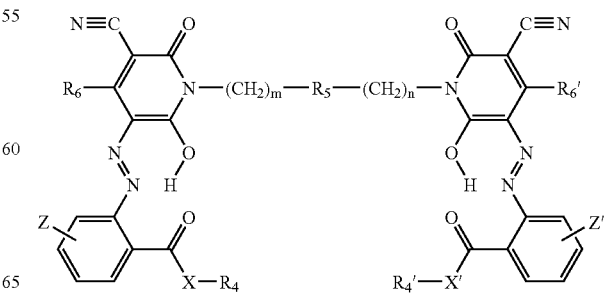

U.S. Pat. No. 6,646,111 of Rina Carlini et al. entitled "Dimeric Azo Pryidone Colorants," which is hereby incorporated by reference herein in its entirety, discloses compounds of the formula

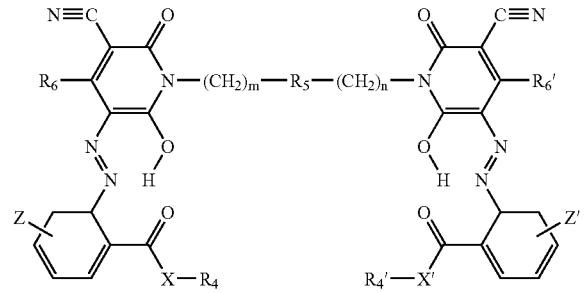

The compounds are useful as colorants, particularly in applications such as phase change inks.

U.S. Pat. No. 6,673,139 of Bo Wu et al. entitled "Phase Change Inks Containing Dimeric Azo Pyridone Colorants," which is hereby incorporated by reference herein in its entirety, discloses a phase change ink composition comprising a phase change ink carrier and a colorant compound of the formula

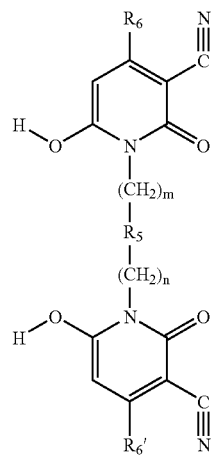

(3) a base present in an amount of al least about 3 molar equivalents of base per mole of pyridone moiety, and (4) an optional buffer salt, and (d) combining either (A) the second solution containing the dianiline and the first solution containing the pyridone, or (B) the second solution containing the aniline and the first solution containing the dipyridone to form a third solution and effect a coupling reaction to form a diazopyridone compound either (A) of the formula

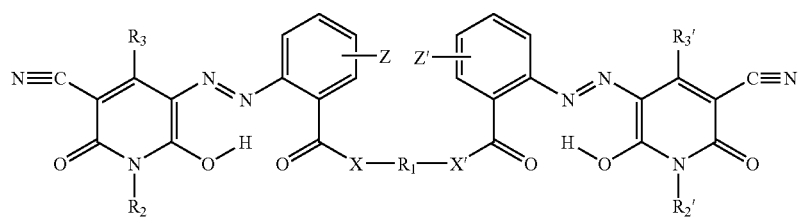

or (B) of the formula

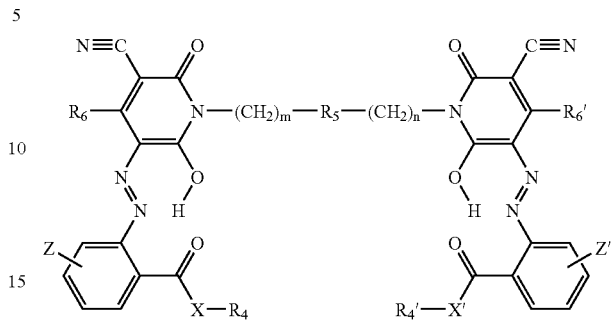

While known compositions are processes are suitable for their intended purposes, a need remains for new colorant compositions, for example new yellow to orange colorant compositions. In addition, a need remains for yellow to orange colorant compositions particularly suitable for use in phase change inks. Further, a need remains for yellow to orange colorants with desirable thermal stability. Additionally, a need remains for yellow to orange colorants that exhibit minimal undesirable discoloration when exposed to elevated temperatures. There is also a need for yellow to orange colorants that exhibit a desirable brilliance. In addition, there is a need for yellow to orange colorants that exhibit a desirable hue. Further, there is a need for yellow to orange colorants that are of desirable chroma. Additionally, there is a need for yellow to orange colorants that have desirable high lightfastness characteristics. A need also remains for yellow to orange colorants that have a desirably pleasing color. In addition, a need remains for yellow to orange colorants that exhibit desirable solubility characteristics in phase change ink carrier compositions. Further, a need remains for yellow to orange colorants that enable phase change inks to be jetted at temperatures of over 135° C. while maintaining thermal stability. Further, a need remains for yellow to orange colorants for use in solid ink printers that operate with lower print head temperatures much lower than 135° C. as well as in ultraviolet radiation curable system. Additionally, a need remains for yellow to orange colorants that enable phase change inks that generate images with low pile height. There is also a need for yellow to orange colorants that enable phase change inks that generate images that approach lithographic than image quality. In addition, there is a need for yellow to orange colorants that exhibit oxidative stability. Further, there is a need for yellow to orange colorants that do not precipitate from phase change ink carriers. Additionally, there is a need for yellow to orange colorants that do not, when included in phase change inks, diffuse into adjacently printed inks of different colors. A need also remains for yellow to orange colorants that do no leach from media such as phase change ink carriers into tape adhesives, paper, or the like. In addition, a need remains for yellow to orange colorants that, when incorporated into phase change inks, do not lead to clogging of a phase change ink jet printhead. Further, there is a need for yellow to orange colorants that enable phase change inks that generate images with sharp edges that remain sharp over time. Additionally, there is a need for yellow to orange colorants that enable phase change inks that generate images which retain their high image quality in warm climates. Further, there is a need for yellow to orange colorants that enable phase change inks that generate images of desirably high optical density. Additionally, there is a need for yellow to orange colorants that, because of their good solubility in phase change ink carriers, enable the generation of images of low pile height without the loss of desirably high optical density. A need also remains for yellow colorants that enable the use of substantially reduced amounts of colorant in, for example, an ink without decreasing the color and the spectral properties (L*a*b*) of the ink or jeopardizing the optical density or color of the prints generated with the ink. A need also remains for yellow to orange colorants that enable cost-effective inks.

The appropriate components and process aspects of the each of the foregoing may be selected for the present disclosure in embodiments thereof.

SUMMARY

The present disclosure is directed to a compound of the formula

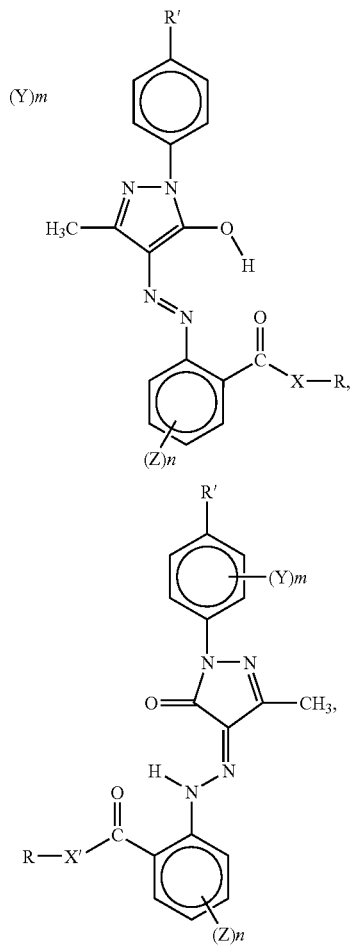

dimers thereof

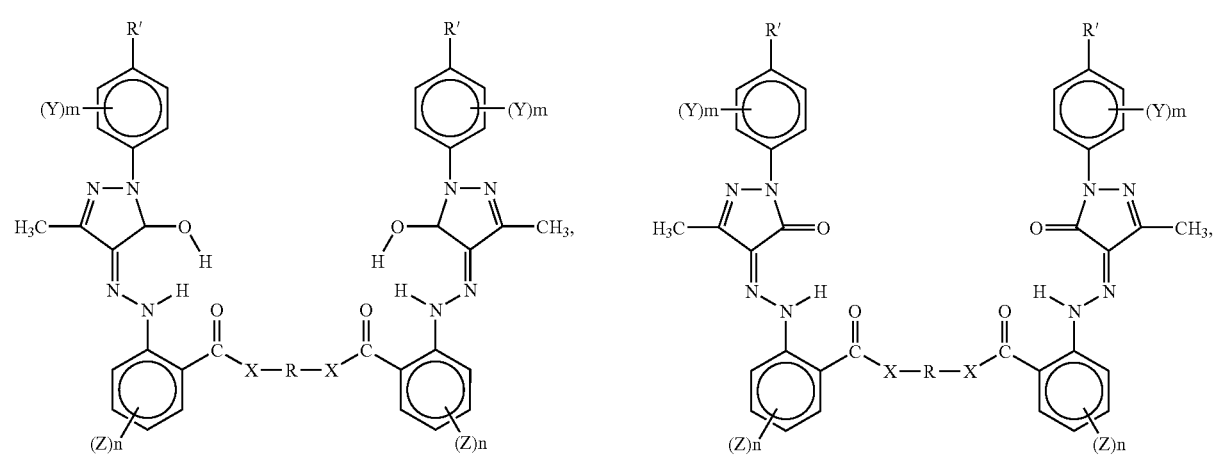

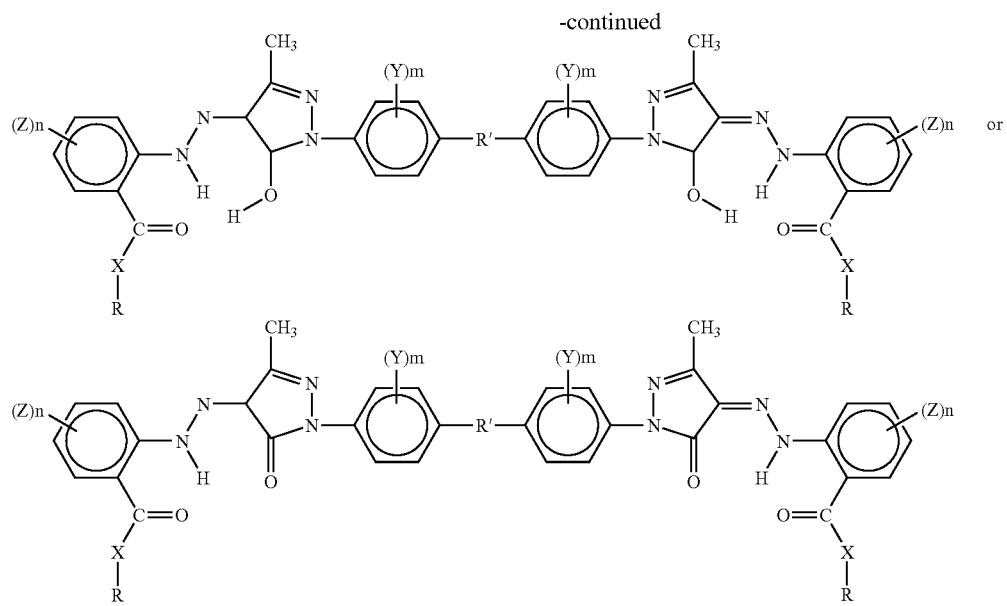

wherein R and R' are each independently selected from (i) and alkyl group, (ii) an alkylene group, (iii) an arylene group, (iv) an arylalkylene group, (v) an alkylarylene group, (iii) an arylene group, (vii) an aryleneoxy group, (viii) an arylalkyleneoxy group, (ix) an alkylaryleneoxy group, (x) a polyalkyleneoxy group, (xi) a polyaryleneoxy group, (xii) a polyarylalkyleneoxy group, (xiii) a polyalkylaryleneoxy group, (xiv) a heterocyclic group, (xv) a silylene group, (xvi) a siloxane group, (xvii) a polysilylene group, (xviii) a polysiloxane group, or (xix) hydrogen, provided both R and R' cannot be hydrogen; and wherein X is a (i) direct bond, (ii) an oxygen atom, (iii) a nitrogen atom, (iv) a sulfur atom, (v) a group of the formula —NR$_{40}$— wherein R$_{40}$ is a hydrogen atom, alkyl group, an aryl group, an arylalkyl group, or an alkylaryl group, (vi) or a group of the formula —CR$_{50}$R$_{60}$—; wherein R$_{50}$ and R$_{60}$ each, independently of the other, is a hydrogen atom, an alkyl group, an aryl group, an arylalkyl group, or an alkylaryl group; and wherein (Y)$_m$ and (Z)$_n$ are each independently optionally present and where (Y)$_m$ and (Z)$_n$ are each independently selected from i) a hydrogen atom, (ii) a halogen atom, (iii) a nitro group, (iv) an alkyl group, (v) an aryl group, (vi) an arylalkyl group, (vii) an alkylaryl group, (viii) a group of the formula

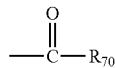

wherein R$_{70}$ is an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, (ix) a sulfonyl group of the formula —SO$_2$R$_{80}$ wherein R$_{80}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, or (x) a phosphoryl group of the formula —PO$_3$R$_{90}$ wherein R$_{90}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group.

and in (Y)m, m is an integer from about 0 to 4, or about 1 to about 3, or about 2 to about 3, and in (Z)n, n is an integer form about 0 to about 4, or about 1 to about 3, or about 2 or about 3.

DETAILED DESCRIPTION

The present disclosure is directed to colorant compounds particularly suitable for use in hot melt or phase change inks. In embodiments, the present disclosure is directed to dimeric colorant compounds particularly suitable for use in hot melt or phase change inks. One embodiments of the present disclosure is directed to compounds of the formula (enol form)

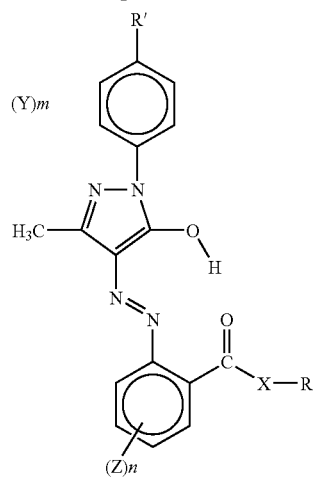

wherein the compound can be dimerized through R or R', including for example, in embodiments, compounds of the formula

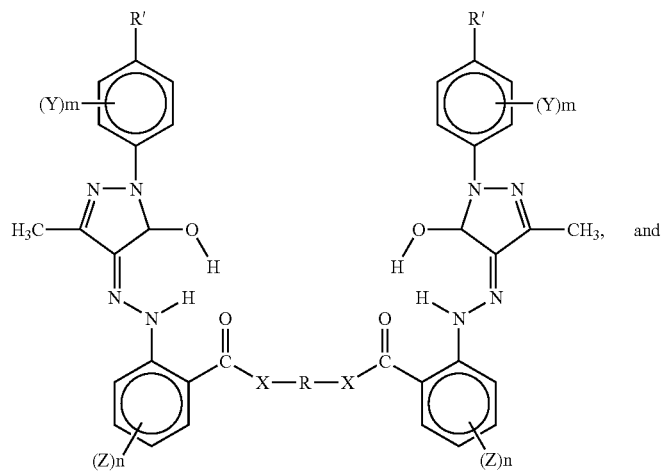
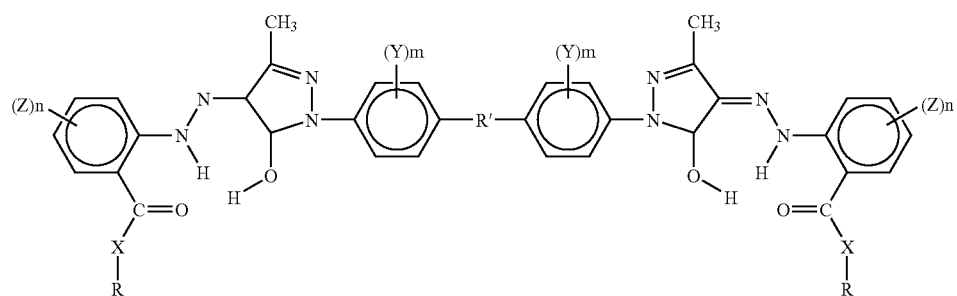
or a compound of the formula (keto form)
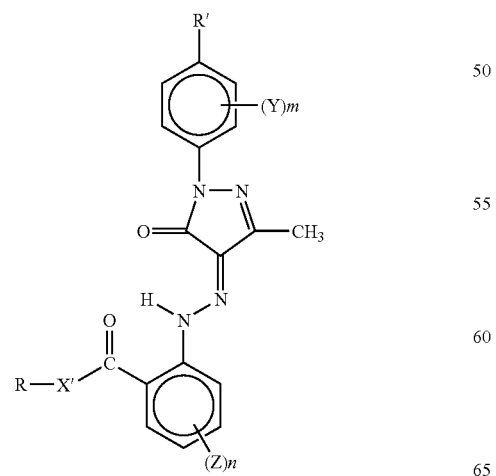

wherein the compound can be dimerized through R or R', including for example, in embodiments, compounds of the formula

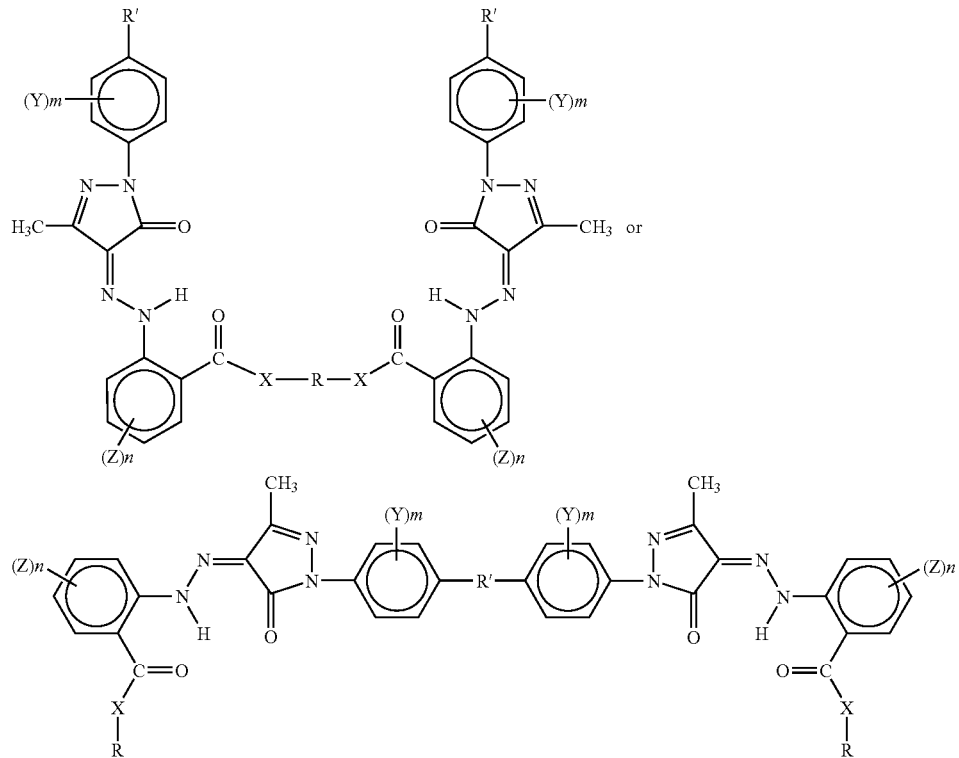

wherein R and R' are each independently selected form (i) an alkyl group (including linear, branched, saturated, unsaturated, cyclic, unsubstituted, and substituted alkyl groups, and wherein hetero atoms, such as oxygen, nitrogen, sulfur, silicon, phosphorus, boron, and the like either may or may not be present in the alkyl group), in one embodiment with at least about 1 to about 50 carbon atoms, in another embodiment with at least about 2 to about 20 carbon atoms, in another embodiment with at least about 4 to about 12 carbon atoms, although the number of carbon atoms can be outside of these ranges;

(ii) an alkylene group, (including linear, branched, saturated, unsaturated, cyclic, an alkylene group including aliphatic cyclic moieties therein, unsubstituted alkylene groups, and wherein hetero atoms, such as oxygen, nitrogen, sulfur, silicon, phosphorus, boron, and the like either may or may not be present in the alkylene group), in one embodiment with at least 1 carbon atom, in another embodiment with at least about 10 carbon atoms, in yet another embodiment with at least about 20 carbon atoms, in still another embodiment with at least about 36 carbon atoms, in one embodiment with no more than about 200 carbon atoms, in another embodiment with no more than about 100 carbon atoms, in another embodiment, with no more than about 60 carbon atoms, in yet another embodiment with no more than about 40 carbon atoms, although the number of carbon atoms can be outside of these ranges;

(iii) an arylene group (including unsubstituted and substituted arylene groups, and wherein hetero atoms, such as oxygen, nitrogen, sulfur, silicon, phosphorus, boron, and the like either may or may not be present in the arylene group), in one embodiment with at least about 6 carbon atoms, in another embodiment with at least about 13 carbon atoms, in still another embodiment with at least about 18 carbon atoms, and in yet another embodiment with at least about 23 carbon atoms, and in one embodiment with no more than about 100 carbon atoms, in another embodiment with no more than about 75 carbon atoms, and in yet another embodiment with no more than about 50 carbon atoms, although the number of carbon atoms can be outside of these ranges;

(iv) an arylalkylene group (including unsubstituted and substituted arylalkylene groups, and wherein hetero atoms, such as oxygen, nitrogen, sulfur silicon, phosphorus, boron, and the like either may or may not be present in either the aryl or the alkyl portion of the arylalkylene group), in one embodiment with at least about 7 carbon atoms, in another embodiment with at least about 18 carbon atoms, in yet another embodiment with at least about 30 carbon atoms, in another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges;

(v) an alkylarylene group, (including unsubstituted and substituted alkylarylene groups, and wherein hetero atoms, such as oxygen, nitrogen, sulfur, silicon, phosphorus, boron, and the like either may or may not be present in either the alkyl or the aryl portion of the alkylarylene group), in one embodiment with at least about 7 carbon atoms, in another embodiment with at least about 18 carbon atoms, in yet another embodiment with at least about 30 carbon atoms, in another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges;

(vi) an alkyleneoxy group, (including linear, branched, saturated, unsaturated, cyclic, unsubstituted, and substituted alkyleneoxy groups, and wherein hetero atoms, such as oxygen, nitrogen, sulfur, silicon, phosphorus, boron, and the like either may or may not be present in the alkyl portion of the alkyleneoxy group), in one embodiment with at least 1 carbon atom, in another embodiment with at least about 10 carbon atoms, in another embodiment with at least about 20 carbon atoms, and in one embodiment with no more than about 200 carbon atoms, in another embodiment with no more than about 100 carbon atoms, in still another embodiment with no more than about 60 carbon atoms;

(vii) an aryleneoxy group, (including unsubstituted and substituted aryleneoxy groups, and wherein hetero atoms, such as oxygen, nitrogen, sulfur, silicon, phosphorus, boron, and the like either may or may not be present in the aryl portion of the aryleneoxy group), in one embodiment with at least about 6 carbon atoms, in another embodiment with at least about 13 carbon atoms, in still another embodiment with at least about 18 carbon atoms, and in one embodiment with no more than about 100 carbon atoms, in another embodiment with no more than about 75 carbon atoms, and in yet another embodiment with no more than about 50 carbon atoms, although the number of carbon atoms can be outside of these ranges;

(viii) an arylalkyleneoxy group, (including and substituted arylalkyleneoxy groups, and wherein hetero atoms, such as oxygen, nitrogen, sulfur, silicon, phosphorus, boron, and the like either may or may not be present in the either the aryl or the alkyl portion of the arylalkyleneoxy group), in one embodiment with at least about 7 carbon atoms, in another embodiment with at least about 18 carbon atoms, in yet another embodiment with at least about 30 carbon atoms, in another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges;

(ix) an alkylaryleneoxy group, (including unsubstituted and substituted alkylaryleneoxy groups, and wherein hetero atoms, such as oxygen, nitrogen, sulfur, silicon, phosphorus, boron, and the like either may or may not be present in the alkyl or the aryl portion of the alkylaryleneoxy group), in one embodiment with at least about 7 atoms, in another embodiment with at least about 18 carbon atoms, in yet another embodiment with at least about 30 carbon atoms, in another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges;

(x) a polyalkyleneoxy group, wherein the alkyl portion of the repeat alkyleneoxy groups typically has from about 1 to about 12 carbon atoms, although the number of carbon atoms can be outside of these ranges, such as a polyethyleneoxy group, a polyaryleneoxy group, a polybutyleneoxy group, or the like, and wherein the number of repeat alkyleneoxy group typically is from about 2 to about 50 repeat alkyleneoxy groups, although the number of repeat units can be outside of these ranges;

(xi) a polyaryleneoxy group, wherein the aryl portion of the repeat aryleneoxy group typically has from about 6 to about 14 carbon atoms, although the number of carbon atoms can be outside of these ranges, such as a polyphenyleneoxy group, a polynaphthaleneoxy group, a polyphenanthreneoxy group, or the like, and wherein the number of repeat aryleneoxy groups typically is from about 2 to about 20 repeat aryleneoxy groups, although the number of repeat units can be outside of these ranges;

(xii) a polyarylalkyleneoxy group, wherein the arylalkyl portion of the repeat arylalkyleneoxy groups typically has from about 7 to about 50 carbon atoms, although the number of carbon atoms can be outside of these ranges, such as polybenzyleneoxy group, a polyphenylethyleneoxy group, or the like, and wherein the number of repeat arylalkyleneoxy groups typically is from about 2 to about 20 repeat arylalkyleneoxy groups, although the number of repeat units can be outside of these ranges;

(xiii) a polyalkylaryleneoxy group, wherein the alkylaryl portion of the repeat alkylaryleneoxy groups typically has from about 7 to about 50 carbon atoms, although the number of carbon atoms can be outside of these ranges, such as a polytolueneoxy group or the like, and wherein the number of repeat alkylaryleneoxy groups typically is from about 2 to about 20 repeat alkylaryleneoxy groups, although the number of repeat units can be outside of these ranges;

(xiv) a heterocyclic group, (including unsubstituted and substituted heterocyclic groups), typically with from about 2 to about 12 carbon atoms, and typically with from about 4 to about 18 ring atoms, although the number of carbon atoms and the number of ring atoms can be outside of these ranges, wherein the heteroatoms in the heterocyclic groups can be (but are not limited to) nitrogen, oxygen, sulfur, silicon, phosphorus, boron, and the like, as well as mixtures thereof;

(xv) a silylene group, (including unsubstituted and substituted silylene groups);

(xvi) a siloxane group, (including unsubstituted and substituted siloxane groups);

(xvii) a polysilylene group, (including unsubstituted and substituted polysilylene groups), typically with from 2 to about 100 repeat silylene units, or (xviii) a polysiloxane group (including unsubstituted and substituted polysiloxane groups), typically with from 2 to about 200 repeat siloxane units, although the number of repeat siloxane units can be outside of this range, wherein the substituents on the substituted alkylene, arylene, arylalkylene, alkylarylene, alkyleneoxy, aryleneoxy, arylalkyleneoxy, alkylaryleneoxy, polyalkyleneoxy, polyaryleneoxy, polyarylalkyleneoxy, polyalkylaryleneoxy, heterocyclic, silylene, siloxy, polysilylene, and polysiloxy groups are hydroxy groups, halogen atoms, cyano groups, ether groups, aldehyde groups, ketone groups, carboxylic acid groups, ester groups, amide groups, carboxyl groups, thiocarbonyl groups, sulfate groups, sulfonate groups, sulfide groups, sulfoxide groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, mixtures thereof, and the like, wherein the substituents on the silylene, siloxy, polysilylene, and polysiloxy groups can also be alkyl groups, aryl groups, arylalkyl groups, and alkylaryl groups, wherein two or more substituents can be joined together to form a ring; or (xix) hydrogen, provided both R and R' cannot be hydrogen;

wherein X is a (i) direct bond, (ii) an oxygen atom, (iii) a nitrogen atom, (iv) a sulfur atom, (v) a group of the formula —$NR_{40}$— wherein $R_{40}$ is a hydrogen atom, an alkyl group (including linear, branched, saturated, unsaturated, cyclic, unsubstituted, and substituted alkyl groups, and wherein hetero atoms, such as oxygen, nitrogen, sulfur, silicon, phosphorus, boron, and the like either may or may not be present in the alkyl group), typically with from 1 to about 50 carbon atoms, or from about 2 to about 20 carbon atoms, or from about 4 to about 12 carbon atoms, although the number of carbon atoms can be outside of these ranges, an aryl group (including substituted aryl groups, and wherein hetero atoms, such as oxygen, nitrogen, sulfur, silicon, phosphorus, boron, and the like either may or may not be present in the aryl group), typically with from about 6 to about 50 carbon atoms, or from about 6 to about 20 carbon atoms, or from about 6 to about 10 carbon atoms, although the number of carbon atoms can be outside of these ranges, an arylalkyl groups (including substituted arylalkyl groups, and wherein hetero atoms, such as oxygen, nitrogen, sulfur, silicon, phosphorus, boron, and the like either may or may not be present in either the aryl portion or the alkyl portion of the arylalkyl group), typically with from about 7 to about 100 carbon atoms, or from about 7 to 50 carbon atoms, or from about 7 to about 20 carbon atoms, although the number of carbon atoms can be outside of these ranges, or an alkylaryl group (including substituted alkylaryl groups, and wherein hetero atoms, such as oxygen, nitrogen, sulfur, silicon, phosphorus, boron, and the like either may or may not be present in the alkyl portion or the aryl portion of the alkylaryl group), typically with from about 7 to about 100 carbon atoms, or from about 7 to about 50 carbon atoms, or from about 7 to about 20 carbon atoms, although the number of carbon atoms, can be outside of these ranges, or (v) a group of the formula —$CR_{50}R_{60}$— wherein $R_{50}$ and $R_{60}$ each, independently of the other, is a hydrogen atom, an alkyl group (including linear, branched, saturated, unsaturated, cyclic, unsubstituted, and substituted alkyl groups, and wherein hetero atoms, such as oxygen, nitrogen, sulfur, silicon, phosphorus, boron, and the like either may or may not be present in the alkyl group), typically with from 1 to about 50 carbon atoms, or from about 2 to about 20 carbon atoms, or from about 4 to about 12 carbon atoms, although the number of carbon atoms can be outside of these ranges, an aryl group (including substituted aryl groups, wherein hetero atoms, such as oxygen, nitrogen, sulfur, silicon, phosphorus, boron, and the like either may or may not be present in the aryl group), typically with from about 6 to about 50 carbon atoms, or from about 6 to about 20 carbon atoms, or from about 6 to about 10 carbon atoms, although the number of carbon atoms can be outside of these ranges, an arylalkyl group (including substituted arylalkyl groups, and wherein hetero atoms, such as oxygen, nitrogen, sulfur, silicon, phosphorus, boron, and the like either may or may not be present in the aryl portion or the alkyl portion of the arylalkyl group), typically with from about 7 to about 100 carbon atoms, or from about 7 to about 50 carbon atoms, or from about 7 to about 20 carbon atoms, although the number of carbon atoms can be outside of these ranges, or an alkylaryl group (including substituted alkylaryl groups, and wherein hetero atoms, such as oxygen, nitrogen, sulfur, silicon, phosphorus, boron, and the like either may or may not be present in the alkyl portion or the aryl portion of the alkylaryl group), typically with from about 7 to about 100 carbon atoms, or from about 7 to about 50 carbon atoms, or from about 7 to about 20 carbon atoms, although the number of carbon atoms can be outside of these ranges, wherein the substituents on the substituted alkyl, aryl, arylalkyl, and alkylaryl groups can be (but are no limited to) hydroxy group, halogen atoms, amine groups, imine groups, ammonium groups, pyridine groups, pyridinium groups, ether groups, aldehyde groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, sulfone groups, acyl groups, acid anhydride groups, azide groups, cyanato groups, isocyanato groups, thiocyanato groups isothiocyanato groups, mixtures thereof, and the like, wherein the two or more substituents can be joined together to form a ring; and $(Y)_m$ and $(Z)_n$ each, independently of the others, is (i) a hydrogen atom, (ii) a halogen atom, including fluorine, chlorine, bromine, and iodine, (iii) a nitro group, (iv) an alkyl group (including linear, branched, saturated, unsaturated, cyclic, unsubstituted, and substituted alkyl groups, and wherein hetero atoms, such as oxygen, nitrogen, sulfur, silicon, phosphorus, boron, and the like either may or may not be present in the alkyl group), typically with from 1 to about 50 carbon atoms, or from about 1 to about 20 carbon atoms, and or from about 1 to about 10 carbon atoms, although the number of carbon atoms can be outside of these ranges, (v) an aryl group (including substituted aryl groups, and wherein hetero atoms, such as oxygen, nitrogen, sulfur, silicon, phosphorus, boron, and the like either may or may not be present in the aryl group), typically with from about 6 to about 50 carbon atoms, or from about 6 to about 14 carbon atoms, or from about 6 to about 10 carbons, although the number of carbon atoms can be outside of these ranges, (vi) an arylalkyl group (including substituted arylalkyl groups, and wherein hetero atoms, such as oxygen, nitrogen, sulfur, silicon, phosphorus, boron, and the like either may or may not be present in either the aryl portion or the alkyl portion of the arylalkyl group), typically with from about 7 to about 50 carbon atoms, or from about 7 to about 25 carbon atoms, and or from about 7 to about 15 carbon atoms, although the number of carbon atoms can be outside of these ranges, (vii) an alkylaryl group (including substituted alkylaryl groups, and wherein hetero atoms, such as oxygen, nitrogen, sulfur, silicon, phosphorus, boron, and the like either may or may not be present in the alkyl portion or the aryl portion of the alkylaryl group), typically with from about 7 to about 50 carbon atoms, or from about 7 to about 25 carbon atoms, or from about 7 to about 15 carbon atoms, although the number of carbon atoms can be outside of these ranges, (viii) a group of the formula

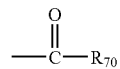

wherein $R_{70}$ is an alkyl group (including linear, branched, saturated, unsaturated, cyclic, unsubstituted, and substituted alkyl groups, and wherein hetero atoms, such as oxygen, nitrogen, sulfur, silicon, phosphorus, boron, and the like either may or may not be present in the alkyl group), typically with from 1 to about 50 carbon atoms or from about 1 to about 20 carbon atoms, or from about 1 to about 10 carbon atoms, although the number of carbon atoms can be outside of these ranges, an aryl group (including substituted aryl groups, and wherein hetero atoms, such as oxygen, nitrogen, nitrogen, sulfur, silicon, phosphorus, boron, and the like either may or may not be present in the aryl group), typically with from about 6 to about 50 carbon atoms, or about 6 to about 20 carbon atoms, or about 6 to about 14 carbon atoms, although the number of carbon atoms can be outside of these ranges, an arylalkyl group (including substituted arylalkyl groups, and wherein hetero atoms, such as oxygen, nitrogen, sulfur, silicon, phosphorus, boron, and the like either may or may not be present in the aryl portion or the alkyl portion of the arylalkyl group), typically with from about 7 to about 50 carbon atoms, or about 7 to about 25 carbon atoms, and or about 7 to about 15 carbon atoms, although the number of carbon atoms can be outside of these ranges, an alkylaryl group (including substituted alkylaryl groups, and wherein hetero atoms, such as oxygen, nitrogen, sulfur, silicon, phosphorus, boron, and the like either may or may not be present in the alkyl portion or the aryl portion of the alkylaryl group), typically with from about 7 to about 50 carbon atoms, or about 7 to about 25 carbon atoms, or about 7 to about 15 carbon atoms, although the number of carbon atoms can be outside of these ranges, an alkoxy group (including linear, branched, saturated, unsaturated, cyclic, unsubstituted, and substituted alkoxy groups, and wherein hetero atoms, such as oxygen, nitrogen, sulfur, silicon, phosphorus, boron, and the like either may or may not be present in the alkyl portion of the alkoxy group), typically with from about 1 to about 50 carbon atoms, or about 4 to about 20 carbon atoms, or about 8 to about 12 carbon atoms, although the number of carbon atoms can be outside of these ranges, an aryloxy group (including substituted aryloxy groups, and wherein hetero atoms, such as oxygen, nitrogen, nitrogen, sulfur, silicon, phosphorus, boron, and the like either may or may not be present in the aryl portion or the aryloxy group), typically with from about 6 to about 50 carbon atoms, or about 6 to about 20 carbon atoms, or about 6 to about 14 carbon atoms, although the number of carbon atoms can be outside of these ranges, and arylalkyloxy group (including substituted arylalkyloxy groups, and wherein hetero atoms, such as oxygen, nitrogen, sulfur, silicon, phosphorus, boron, and the like either may or may not be present in the aryl portion or the alkyl portion of the arylalkyloxy group), typically with from about 7 to about 50 carbon atoms, or about 7 to 25 carbon atoms, or about 7 to about 15 carbon atoms, although the number of carbon atoms can be outside of these ranges, an alkylaryloxy group (including substituted alkylaryloxy groups, and wherein hetero atoms, such as oxygen, nitrogen, sulfur, silicon, phosphorus, boron, and the like either may or may not be present in the alkyl portion or the aryl portion of the of the alkylaryloxy group), typically with from about 7 to about 50 carbon atoms, or about 7 to about 25 carbon atoms, or about 7 to about 15 carbon atoms, although the number of carbon atoms can be outside of these ranges, a polyalkyleneoxy group, wherein the alkyl portion of the repeat alkyleneoxy group typically has from about 1 to about 12 carbon atoms, although the number of carbon atoms can be outside of these ranges, such as a polyethyleneoxy group, a polypropyleneoxy group, a polybutyleneoxy group, or the like, and wherein the number of repeat alkyleneoxy groups typically is from about 2 to about 50 repeat alkyleneoxy groups, although the number of repeat units can be outside of these ranges, a polyaryleneoxy group, wherein the aryl portion of the repeat aryleneoxy groups typically has from about 6 to about 14 carbon atoms, although the number of carbon atoms can be outside of these ranges, such as a polyphenyleneoxy group, a polynaphthaleneoxy group, a polyphenanthreneoxy group, or the like, and wherein the number of repeat aryleneoxy groups typically is from about 2 to about 20 repeat aryleneoxy groups, although the number of repeat units can be outside of these ranges, a polyarylalkyleneoxy group, wherein the arylalkyl portion of the repeat arylalkyleneoxy groups typically has from about 7 to about 50 carbon atoms, although the number of carbon atoms can be outside of these ranges, such as a polybenzyleneoxy group, a polyphenylethyleneoxy group, or the like, and wherein the number of repeat arylalkyleneoxy groups typically is from about 2 to about 20 repeat arylalkyleneoxy groups, although the number of repeat units can be outside of these ranges, a polyalkylaryleneoxy group, wherein the alkylaryl portion of the repeat alkylaryleneoxy groups typically has from about 7 to about 50 carbon atoms, although the number of carbon atoms can be outside of these ranges, such as a polytolueneoxy group or the like, and wherein the number of repeat alkylaryleneoxy groups typically is from about 2 to about 20 repeat alkylaryleneoxy groups, although the number of repeat units can be outside of these ranges, a heterocyclic group (including unsubstituted and substituted heterocyclic groups), typically with from about 2 to about 12 carbon atoms, and typically with from about 4 to about 18 ring atoms, although the number of carbon atoms and the number of ring atoms can be outside of these ranges, wherein the heteroatoms in the heterocyclic groups can be (but are not limited to) nitrogen, oxygen, sulfur, silicon, phosphorus, boron, and the like, as well as mixtures thereof, silyl group (including unsubstituted and substituted silyl groups), a siloxane group (including unsubstituted and substituted siloxane groups), a polysilylene group (including unsubstituted and substituted polysilylene groups), typically with from 2 to about 100 repeat silylene units, or a polysiloxane group (including unsubstituted and substituted polysiloxane groups), typically with from 2 to about 200 repeat siloxane units, although the number of repeat siloxane units can be outside of this range, (ix) a sulfonyl group of the formula —$SO_2R_{80}$, wherein $R_{80}$ is a hydrogen atom, an alkyl group (including linear, branched, saturated, unsaturated, cyclic, unsubstituted, and substituted alkyl groups, and wherein hetero atoms, such as oxygen, nitrogen, sulfur, silicon, phosphorus, boron, and the like either may or may not be present in the alkyl group), typically with from 1 to about 50 carbon atoms, or about 1 to about 20 carbon atoms, or about 1 to about 10 carbon atoms, although the number of carbon atoms can be outside of these ranges, and aryl group (including substituted aryl group, and wherein hetero atoms, such as oxygen, nitrogen, sulfur, silicon, phosphorus, boron, and the like either may or may not be present in the aryl group), typically with from about 6 to about 50 carbon atoms, or about 6 to about 20 carbon atoms, or about 6 to about 14 atoms, although the number of carbon atoms can be outside of these ranges, an arylalkyl group (including substituted arylalkyl groups, wherein hetero atoms, such as oxygen, nitrogen, sulfur, silicon, phosphorus, boron, and the like either may or may not be present in the aryl portion or the alkyl portion of the arylalkyl group), typically with from about 7 to about 50 carbon atoms, or about 7 to about 25 carbon atoms, or about 7 to about 15 carbon atoms, although the 7 to about 25 carbon atoms, or about 7 to about 15 carbon atoms, although the number of carbon atoms can be outside of these ranges, and alkylaryl group (including substituted alkylaryl groups, and wherein hetero atoms, such as oxygen, nitrogen, sulfur, silicon, phosphorus, boron, and the like either may or may not be present in the alkyl portion or the aryl portion of the alkylaryl group), typically with from about 7 to about 50 carbon atoms, or about 7 to about 25 carbon atoms, or about 7 to about 15 carbon atoms, although the number of carbon atoms can be outside of these ranges, an alkoxy group (including linear, branched, saturated, unsaturated, cyclic, unsubstituted, and substituted alkoxy groups, and wherein hetero atoms, such as oxygen, nitrogen, sulfur, silicon, phosphorus, boron, and the like either may or may not be present in the alkyl portion of the alkoxy group), typically with from about 1 to about 50 carbon atoms, or about 4 to about 20 carbon atoms, or about 8 to about 12 carbon atoms, although the number of carbon atoms can be outside of these ranges, an aryloxy group (including substituted aryloxy groups, and wherein hetero atoms, such as oxygen, nitrogen, sulfur, silicon, phosphorus, boron, and the like either may or may not be present in the aryl portion of the aryloxy group), typically with from about 6 to about 50 carbon atoms, or about 6 to about 20 carbon atoms, or about 6 to about 14 carbon atoms, although the number of carbon atoms can be outside of these ranges, an arylalkyloxy group (including substituted arylalkyloxy groups, and wherein hetero atoms, such as oxygen, nitrogen, sulfur, silicon, phosphorus, boron, and the like either may or may not be present in the aryl portion or the alkyl portion of the arylalkyloxy group), typically with from about 7 to about 50 carbon atoms, or about 7 to about 25 carbon atoms, or about 7 to about 15 carbon atoms, although the number of carbon atoms can be outside of these ranges, an alkylaryloxy group (including substituted alkylaryloxy groups, and wherein hetero atoms, such as oxygen, nitrogen, sulfur, silicon, phosphorus, boron, and the like either may or may not be present in the alkyl portion or the aryl portion of the alkylaryloxy group), typically with from about 7 to about 50 carbon atoms, or about 7 to about 25 carbon atoms, or about 7 to about 15 carbon atoms, although the number of carbon atoms can be outside of these ranges, a polyalkyleneoxy group, wherein the alkyl portion of the repeat alkyleneoxy groups typically has from about 1 to about 12 carbon atoms, although the number of carbon atoms can be outside of these ranges, such as a polyethyleneoxy group, a polypropyleneoxy group, a polybutyleneoxy group, or the like, and wherein the number of repeat alkyleneoxy groups typically is from about 2 to about 50 repeat alkyleneoxy groups, although the number of repeat units can be outside of these ranges, a polyaryleneoxy group, wherein the aryl portion of the repeat aryleneoxy groups typically has from about 6 to about 14 carbon atoms, although the number of carbon atoms can be outside of these ranges, such as a polyphenyleneoxy group, a polynaphthaleneoxy group, a polyphenanthreneoxy group, or the like, and wherein the number of repeat aryleneoxy groups typically is from about 2 to about 20 repeat aryleneoxy groups, although the number of repeat units can be outside of these ranges, a polyarylalkyleneoxy group, wherein the arylalkyl portion of the repeat arylalkyleneoxy groups typically has from about 7 to about 50 carbon atoms, although the number of carbon atoms can be outside of these ranges, such as a polybenzyleneoxy group, a polyphenylethyleneoxy group, or the like, and wherein the number of repeat arylalkyleneoxy groups typically is from about 2 to about 20 repeat arylalkyleneoxy groups, although the number of repeat units can be outside of these ranges, a polyalkylaryleneoxy group, wherein the alkylaryl portion of the repeat alkylaryleneoxy groups typically has from about 7 to about 50 carbon atoms, although the number of carbon atoms can be outside of these ranges, such as a polytolueneoxy group or the like, and wherein the number of repeat alkylaryleneoxy groups typically is from about 2 to about 20 repeat alkylaryleneoxy groups, although the number of repeat units can be outside of these ranges, a heterocyclic group (including unsubstituted and substituted heterocyclic groups), typically with from about 2 to about 12 carbon atoms, and typically with from about 4 to about 18 ring atoms, although the number of carbon atoms and the number of ring atoms can be outside of these rangers, wherein the heteroatoms in the heterocyclic groups can be (but are no limited to) nitrogen, oxygen, sulfur, silicon, phosphorus, boron, and the like, as well as mixtures thereof, a silyl group (including unsubstituted and substituted silyl groups), a siloxane group (including unsubstituted and substituted siloxane groups), a polysilylene group (including unsubstituted and substituted polysilylene groups), typically with from 2 to about 100 repeat silylene units, or a polysiloxane group (including unsubstituted and substituted polysiloxane groups), typically with from 2 to about 200 repeat siloxane units, although the number of repeat siloxane units can be outside of this range, or (x) a phosphoryl group of the formula —PO$_3$R$_{90}$ wherein R$_{90}$ is a hydrogen atom, an alkyl group (including linear, branched, saturated, unsaturated, cyclic unsubstituted, and substituted alkyl groups, and wherein hetero atoms, such as oxygen, nitrogen, sulfur, silicon, phosphorus, boron, and the like either may or may not be present in the alkyl group), typically with from 1 to about 50 carbon atoms, or about 1 to about 20 carbon atoms, or about 1 to about 10 carbon atoms, although the number of carbon atoms can be outside of these ranges, an aryl group (including substituted aryl groups), typically with from about 6 to about 50 carbon atoms, or about 6 to about 20 carbon atoms, or about 6 to about 14 carbon atoms, although the number of carbon atoms can be outside of these ranges, an arylalkyl group (including substituted arylalkyl groups), typically with from about 7 to about 50 carbon atoms, or about 7 to about 25 carbon atoms, or about 7 to about 15 carbon atoms, although the number of carbon atoms can be outside of these ranges, an alkylaryl group (including substituted alkylaryl groups), typically with from about 7 to about 50 carbon atoms, or about 7 to about 25 carbon atoms, or about 7 to about 15 carbon atoms, although the number of carbon atoms can be outside of these ranges, an alkoxy group (including linear, branched, saturated, unsaturated, cyclic, unsubstituted, and substituted alkoxy groups, and wherein hetero atoms, such as oxygen, nitrogen, sulfur, silicon, phosphorus, boron, and the like either may or may not be present in the alkyl portion of the alkoxy group), typically with from about 1 to about 50 carbon atoms, or about 4 to about 20 carbon atoms, or about 8 to about 12 carbon atoms, although the number of carbon atoms can be outside of these ranges, an aryloxy group (including substituted aryloxy group), typically with from about 6 to about 50 carbon atoms, preferably with from about 6 to about 20 carbon atoms, or about 6 to about 14 carbon atoms, although the number of carbon atoms can be outside of these ranges, an arylalkyloxy group (including substituted arylalkyloxy groups), typically with from about 7 to about 50 carbon atoms, or about 7 to about 25 carbon atoms, or about 7 to about 15 carbon atoms, although the number of carbon atoms can be outside of these ranges, an alkylaryloxy group (including substituted alkylaryloxy groups), typically with from about 7 to about 15 carbon atoms, or about 7 to about 25 carbon atoms, or about 7 to about 15 of carbon atoms, although the number of carbon atoms can be outside of these ranges, a polyalkyleneoxy group, wherein the alkyl portion of the repeat alkyleneoxy groups typically has from about 1 to about 12 carbon atoms, although the number of carbon atoms can be outside of these ranges, such as a polyethyleneoxy group, a polypropyleneoxy group, a polybutyleneoxy group, or the like, and wherein the number of repeat alkyleneoxy groups typically is from about 2 to about 50 repeat alkyleneoxy groups, although the number of repeat units can be outside of these ranges, a polyaryleneoxy group, wherein the aryl portion of the repeat aryleneoxy group typically has from about 6 to about 14 carbon atoms, although the number of carbon atoms can be outside of these ranges, such as a polyphenyleneoxy group, a polynaphthaleneoxy group, a polyphenanthreneoxy group, or the like, and wherein the number of repeat aryleneoxy groups typically is from about 2 to about 20 repeat aryleneoxy groups, although the number of repeat units can be outside of these ranges, a polyarylalkyleneoxy group, wherein the arylalkyl portion of the repeat arylalkyleneoxy groups typically has from about 7 to about 50 carbon atoms, although the number of carbon atoms can be outside of these ranges, such as a polybenzyleneoxy group, a polyphenylethyleneoxy group, or the like, and wherein the number of repeat arylalkyleneoxy groups typically is from about 2 to about 20 repeat arylalkyleneoxy groups, although the number of repeat units can be outside of these ranges, a polyalkylaryleneoxy group, wherein the alkylaryl portion of the repeat alkylaryleneoxy groups typically has from about 7 to about 50 carbon atoms, although the number of carbon atoms can be outside of these ranges, such as a polytolueneoxy group or the like, and wherein the number of repeat alkylaryleneoxy groups typically is from about 2 to about 20 repeat alkylaryleneoxy groups, although the number of repeat units can be outside of these ranges, a heterocyclic groups (including unsubstituted and substituted heterocyclic groups), typically with from about 2 to about 12 carbon atoms, and typically with from about 4 to about 18 ring atoms, although the number of carbon atoms and the number of ring atoms can be outside of these ranges, wherein the heteroatoms in the heterocyclic groups can be (but are not limited to) nitrogen, oxygen, sulfur, silicon, phosphorus, boron, and the like, as well as mixtures thereof, a silyl group (including unsubstituted and substituted silyl groups), a siloxane group (including unsubstituted and substituted siloxane groups), a polysilylene group (including unsubstituted and substituted polysilylene groups), typically with from 2 to about 100 repeat silylene units, or a polysiloxane group (including unsubstituted and substituted polysiloxane groups, typically with from 2 to about 200 repeat siloxane units, although the number of repeat siloxane units can be outside of this range, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, polyalkylaryleneoxy, heterocyclic, silyl, siloxy, polysilylene, and polysiloxy groups are hydroxy groups, halogen atoms, cyano groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, mixtures thereof, and the like, wherein the substituents on the silylene, siloxy, polysilylene, and polysiloxy groups can also be alkyl groups, aryl groups, arylalkyl groups, and alkylaryl groups, wherein two or more substituents can be joined together to form a ring, and wherein $(Y)_m$ and $(Z)_n$ can be the same as each other or different from each other. Up to 4 $(Y)_m$ groups can be present on the molecule. Up to 4 $(Z)_n$ groups can be present on the molecule.

In $(Y)m$, m is an integer from about 0 to about 4, or about 1 to about 3, or about 2 to about 3, and in $(Z)n$, n is an integer from about 0 to about 4, or about 1 to about 3, or about 2 to about 3.

The group or groups $(Y)_m$ can be joined together with R to form an ring; and the group of groups $(Z)_n$ can be joined together with R' to form a ring.

Some specific examples of suitable R or R' groups include (but are not limited to) the following, wherein one or both R or R' can be selected from a methyl group of the formula

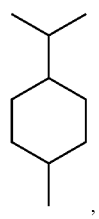

n-hexanediyl, of the formula —$(CH_2)_6$—, n-octanediyl, of the formula —$(CH_2)_8$—, n-decanediyl, of the formula —$(CH_2)_{10}$—, n-dodecanediyl, of the formula —$(CH_2)_{12}$—, 3-methyl-1,5-pentanediyl, of the formula

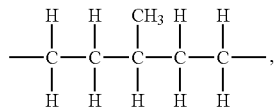

1,4-cyclohexanedimethylene, of the formula (which is not intended to be limited to any particular stereochemistry and includes all cis and trans isomers)

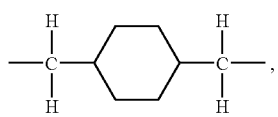

4,4'-isopropylidenedicyclohexanediyl, of the formula (which is not intended to be limited to any particular stereochemistry and includes all cis and trans isomers)

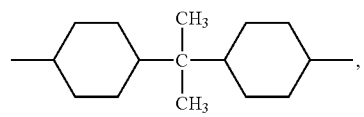

4,4'-bicyclohexyanediyl, of the formula (which is not intended to be limited to any particular stereochemistry and includes all cis and trans isomers)

a branched alkylene group having 36 carbon atoms, including isomers of the formula

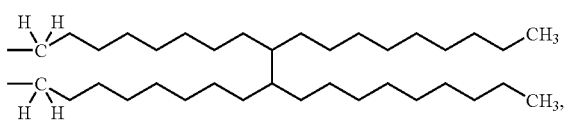

a branched alkylene group having 36 carbon atoms, including isomers of the formula

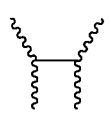

and other branched alkylene isomers (which may include unsaturations and cyclic groups), 4,8-bis(methylene)tricyclo[5.2.1.0$^{2,6}$]decanediyl, of the formula (which is not intended to be limited to any particular stereochemistry and includes all cis and trans isomers)

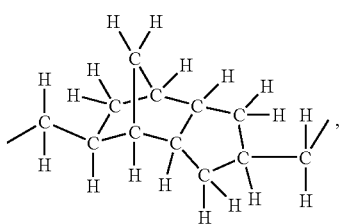

and the like.

Colorants of the present disclosure can be prepared by any desired or effective procedure. For example, they can be prepared by diazotization of the correspondingly substituted dimeric anthranilate compound with nitrosylsulfuric acid under cold temperature conditions, followed by coupling with the correspondingly substituted acetoacetamido in a buffered alkaline aqueous solution under cold temperature conditions, as follows:

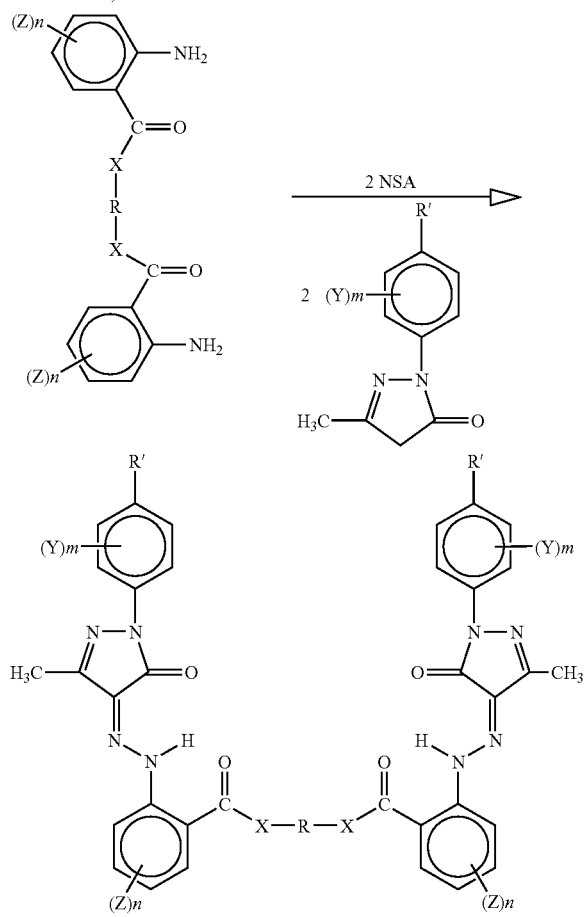

Other methods can be employed including use of $KNO_2$ or $NaNO_2$ and a mineral acid such as HCl or $H_2SO_4$. More specifically, the correspondingly substituted dianthranilate is first subjected to a diazotization reaction by dissolving it in acetic acid diluted with a solvent and, optionally, a second acid, such as sulfuric acid, dodecylbenzene sulfonic acid, propionic acid, hydrochloric acid, phosphoric acid, any other acid useful for a diazotization reaction, or the like, as well as mixtures thereof. The solvent can be any solvent useful in a diazotization reaction, such as water, acetone, dimethylformamide, dimethylacetamide, tetrahydrofuran, dimethoxyethane, analogous higher-boiling ether solvents, and the like, as well as mixtures thereof.

The solvent and the dianthranilate are present in any desired or effective relative amounts, if, for purposes of determining relative amounts, "solvent" is defined to include whatever solvent has been selected plus any amount of acetic acid and second acid present, the reactants are present in this combined solvent in relative amounts of in one embodiment at least about 100 grams of substituted dianthranilate per liter of solvent, in another embodiment at least about 200 grams of substituted dianthranilate per liter of solvent, and in yet another embodiment at least about 230 grams of substituted dianthranilate per liter of solvent, and in one embodiment of no more than about 400 grams of substituted dianthranilate per liter of solvent, in another embodiment of no more than about 300 grams of substituted dianthranilate per liter of solvent, and in yet another embodiment of no more than about 270 grams of substituted dianthranilate per liter of solvent, although the relative amounts can be outside of these ranges.

The acetic acid is present in any desired or effective amount, in one embodiment at least about 1 gram of acetic acid per gram of substituted dianthranilate, in another embodiment at least about 2 grams of acetic acid per gram of substituted dianthranilate, and in yet another embodiment at least about 3 grams of acetic acid per gram of substituted dianthranilate, and in one embodiment no more than about 10 grams of acetic acid per gram of substituted dianthranilate, in another embodiment no more than about 7 grams of acetic acid per gram of substituted dianthranilate, and in yet another embodiment no more than about 5 grams of acetic acid per gram of substituted dianthranilate, although the relative amounts can be outside of these ranges.

When present, the optional second acid is present in any desired or effective amount, in one embodiment at least about 0.05 gram of acid per gram of substituted dianthranilate, and in another embodiment at least about 0.1 gram of acid per gram of substituted dianthranilate, and in one embodiment no more than about 0.5 grams of acid per gram of substituted dianthranilate, in another embodiment no more than about 0.3 grams of acid per gram of substituted dianthranilate, and in yet another embodiment no more than about 0.2 grams of acid per gram of substituted dianthranilate, although the relative amounts can be outside of these ranges.

In the mixture comprising the selected solvent, any optional second acid, and acetic acid, the acetic acid is present in any desired or effective amount, in one embodiment at least about 50 percent by volume of the mixture, in another embodiment at least about 70 percent by volume of the mixture, in yet another embodiment at least about 75 percent by volume of the mixture, and in still another embodiment at least about 9.5 percent by volume of the mixture, although the relative amount can be outside of these ranges.

Upon complete dissolution of the ingredients, the mixture is cooled, in one embodiment to a temperature of no more than about +15° C., in another embodiment to a temperature of no more than about 10° C., in yet another embodiment to a temperature of no more than about +5° C., in still another embodiment to a temperature of no more than about +3° C., and in one embodiment to a temperature of no lower than about −5° C., and in another embodiment to a temperature of no lower than about −10° C., although the temperature can be outside of these ranges.

Thereafter, nitrosylsulfuric acid is added to the mixture in any desired or effective amount, in one embodiment at least about 2 moles of nitrosylsulfuric acid per mole of substituted dianthranilate (i.e., at least about 1 mole of nitrosylsulfuric acid per mole of aniline moiety in the dianthranilate), and in another embodiment at least about 2.1 moles of nitrosylsulfuric acid per mole of substituted dianthranilate, and in one embodiment no more than about 3 moles of nitrosylsulfuric acid per mole of substituted dianthranilate, in another embodiment no more than about 2.5 moles of nitrosylsulfuric acid per mole of substituted dianthranilate, and in yet another embodiment no more than about 2.25 moles of nitrosylsulfuric acid per mole of substituted dianthranilate, although the relative amounts can be outside of these ranges. In a specific embodiment, the nitrosylsulfuric acid is added dropwise at a rate such that the temperature of the reaction mixture does not exceed 15° C.

The reaction to form the diazonium salt is essentially instantaneous, and upon completion of addition of the nitrosylsulfuric acid the reaction is essentially complete. At times, the reaction can take a period of time to complete, from instantaneous to about 6 hours. If desired, a qualitative test can be performed to confirm reaction completion.

Thereafter, residual excess nitrosylsulfuric acid present in the reaction mixture can be quenched by the addition of a quenching agent, such as sulfamic acid, urea, or the like as well as mixtures thereof, in any desired or effective amount, in one embodiment at least about 0.01 mole of quenching agent per mole of nitrosylsulfuric acid (i.e. per mole of nitrosylsulfuric acid originally added to the reaction mixture), in another embodiment at least about 0.05 mole of quenching agent per mole of nitrosylsulfuric acid, and in yet another embodiment at least about 0.1 mole of quenching agent per mole of nitrosylsulfuric acid, and in one embodiment no more than about 0.5 mole of quenching agent per mole of nitrosylsulfuric acid, in another embodiment no more than about 0.3 mole of quenching agent per mole of nitrosylsulfuric acid, and in yet another embodiment no more than about 0.2 mole of quenching agent per mole of nitrosylsulfuric acid, although the amount can be outside of these ranges. Upon completion of the reaction, the reaction mixture contains the corresponding diazonium salt.

A precursor solution of the pyrazolone having the desired substituents thereon is prepared in an appropriate solvent, such as a mixture of water, organic solvents, including lower alcohols such as methanol, ethanol, isopropanol, and the like, water-miscible nonbasic organic solvents such as tetrahydrofuran, acetone, dimethoxyethane, N,N-dimethylformamide, N,N-dimethylacetamide, acetonitrile, sodium acetate/acetic acid, and the like, as well as mixtures thereof. Mixtures of water with an organic solvent can be helpful for ease of solvating inorganic or organic salts that are a reaction byproduct. In this instance, water and the organic solvent are present in any desired or effective relative amounts, in one embodiment at least about 0.25 gram of organic solvent per gram of water, in another embodiment at least about 0.3 gram of organic solvent per gram of water, and in yet another embodiment at least about 0.4 gram of organic solvent per gram of water, and in one embodiment no more than about 4 grams of organic solvent per gram of water, in another embodiment no more than about 3 grams of organic solvent per gram of water, and in yet another embodiment no more than about 2 grams of organic solvent per gram of water, although the relative amounts can be outside of these ranges.

The pyrazolone is present in the precursor solution in any desired or effective amount, in one embodiment at least about 10 grams of pyrazolone per liter of solvent, in another embodiment at least about 30 grams of pyrazolone per liter of solvent, and in yet another embodiment at least about 50 grams of pyrazolone per liter of solvent, and in one embodiment no more than about 200 grams of pyrazolone per liter of solvent, in another embodiment no more than about 100 grams of pyrazolone per liter of solvent, and in yet another embodiment no more than about 70 grams of pyrazolone per liter of solvent, although the relative amounts can be outside of these ranges.

The pyrazolone precursor solution is maintained at an alkaline pH, typically of at least about 10, and in one embodiment no more than about 14, and in another embodiment no more than about 12, although the pH can be outside of these ranges. The pyrazolone precursor solution can contain a mixture of a base and an optional buffering salt.

Examples of suitable bases include mineral bases, such as sodium hydroxide, potassium hydroxide, and the like, as well as water-miscible organic tertiary amines, such as triethanolamine, N,N-diethylethanolamine, and the like, as well as mixtures thereof, present in any desired or effective amount, in one embodiment at least about 1 mole of base per mole of pyrazolone, in another embodiment at least about 2 moles of base per mole of pyrazolone, in yet another embodiment at least about 3 moles of base per mole of pyrazolone, and in still another embodiment at least about 5 moles of base per mole of pyrazolone, and in one embodiment no more than about 10 moles of base per mole of pyrazolone, in another embodiment no more than about 7 moles of base per mole of pyrazolone, and in yet another embodiment no more than about 5 moles of base per mole of pyrazolone, although the relative amounts can be outside of these ranges.

Examples of suitable optional buffer salts include those corresponding to the principal acid solvent; for example, when the principal acid solvent is acetic acid, suitable buffers include sodium acetate, potassium acetate, sodium hydrogenphosphate, citric acid, and the like, as well as mixtures thereof. When present, the optional buffer salt is present in any desired or effective amount, in one embodiment at least about 1 mole of buffer per mole of a pyrazolone, in another embodiment at least about 2 mole of buffer per mole of pyrazolone, in yet another embodiment at least about 3 moles of buffer per mole of pyrazolone, and in still another embodiment at least about 5 moles of buffer per mole of pyrazolone, and in one embodiment no more than about 10 moles of buffer per mole of pyrazolone, in another embodiment no more than about 7 moles of buffer per mole of pyrazolone, and in yet another embodiment no more than about 5 moles of buffer per mole of pyrazolone, although the relative amounts can be outside of these ranges. In a specific embodiment, upon dissolution of the pyrazolone, the thus-formed precursor pyrazolone solution can be filtered to remove any undissolved solids.

The solution containing the diazonium salt, maintained at a cold temperature, is then slowly added to the pyrazolone solution in any desired or effective relative amounts, If the diazonium salt is of a dimeric species (that is, a bis-diazonium salt), in one embodiment at least about 2 moles of acetoacetamide per mole of diazonium salt, in another embodiment at least about 2.1 moles of acetoacetamide per mole of diazonium salt, and in yet another embodiment at least about 2.25 moles of acetoacetamide per mole of diazonium salt, and in one embodiment no more than about 4 moles of acetoacetamide per mole of diazonium salt, in another embodiment no more than about 3 moles of acetoacetamide per mole of diazonium salt, and in yet another embodiment no more than about 2.5 moles of acetoacetamide per mole of diazonium salt, if a monomeric diazonium salt is selected, the moles of acetoacetamide should be halved, although the relative amounts can be outside of these ranges, resulting in the immediate formation of a bright yellow precipitate. Thereafter, the yellow precipitate can be collected by filtration and, if desired, washed.

Precursor dianthranilates can be prepared by any desired or effective method, such as that disclosed in, for example, U.S. Pat. No. 6,713,614 and U.S. Pat. No. 6,576,747, the disclosures of each of which are totally incorporated herein by reference.

Precursor pyrazolones can be prepared by any desired or effective method, such as that disclosed in, for example, Advanced Organic Chemistry: Reactions, Mechanisms and Structures, Jerry March, Second Edition, 1977, page 825, McGraw Hill, Inc., the disclosure of which is totally incorporated herein by reference.
Embodiments of the present colorants include, for example, but are not limited to, a compound of the formula
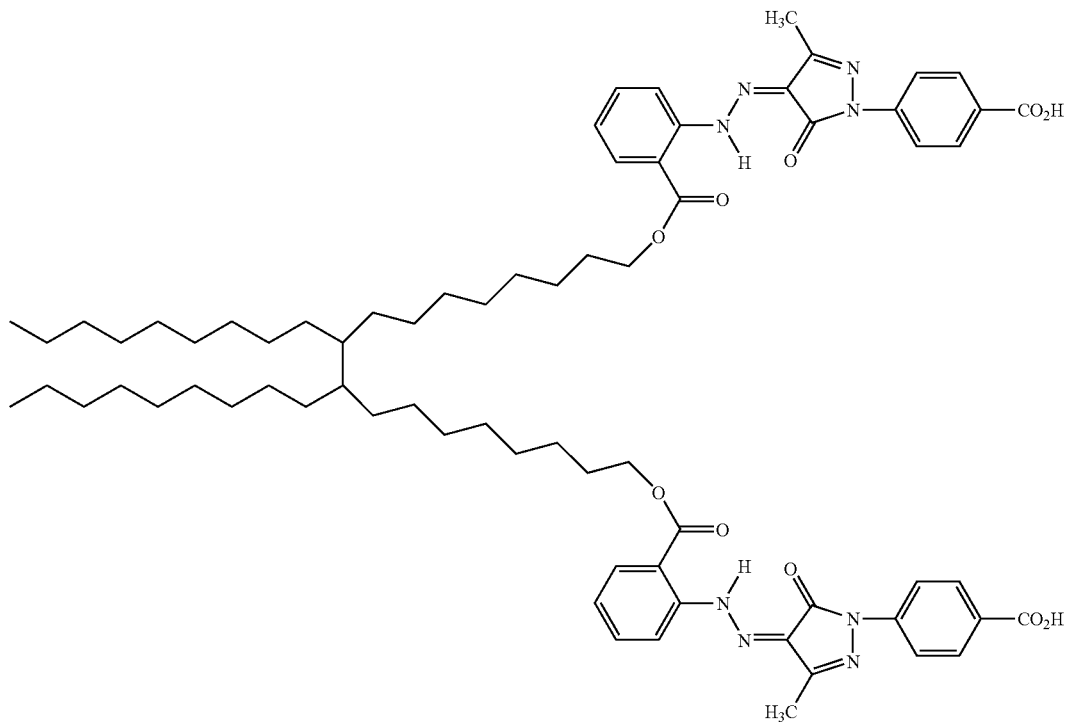
In another embodiment, colorants herein include, for example, a compound of the formula
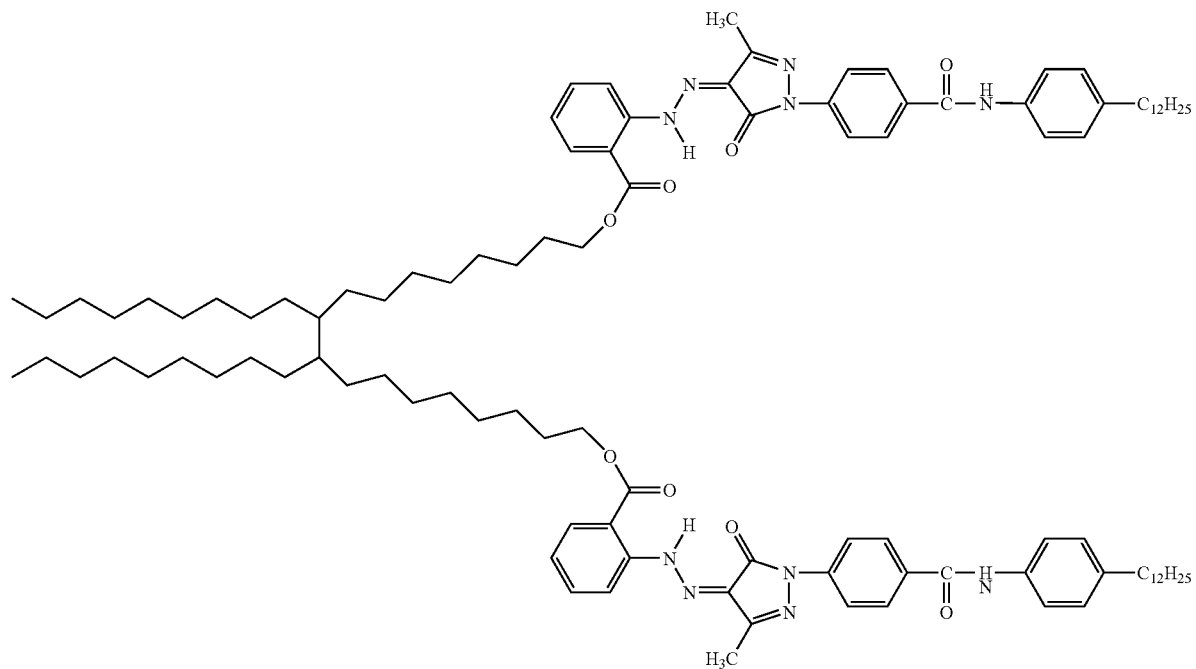

In yet another embodiment, colorants herein include a compound of the formula

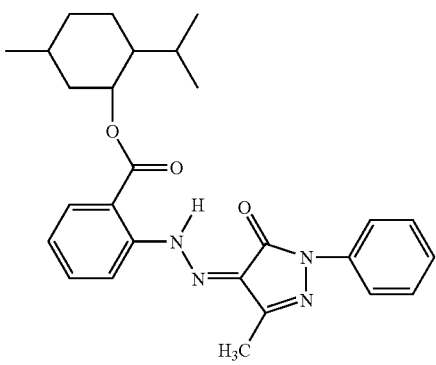

In yet another embodiment, colorants herein include a compound of the formula

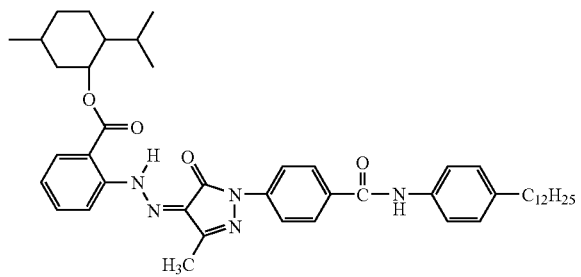

While not being limited to any particular theory, it is believed that in embodiments the structure of the present compounds provide improved migratory and diffusion properties. Further, while not being limited to any particular theory, it is believed that in embodiments the waxy appendages (that is, long chains) protruding from the chromophore at each end provide a compound that is compatible and soluble in the phase changes ink base. It is believed that this structural feature can also impart thermal stability and chemical stability to the colorant molecule. Further, while not being limited to any particular theory, it is believed that including alkyl or alkylene groups with at least about 12 carbon atoms, particularly (although not necessarily) branched alkyl groups of this type, in the colorant molecule further reduce diffusion or leaching of the colorant molecule from a medium such as a phase change ink vehicle into adjacent inks of different colors (leading to intercolor bleed), adjacent unprinted areas (leading to edge raggedness), tape adhesives (leading to edge raggedness and possible illegibility), and the like.

In addition to being suitable for use in phase change inks, the colorants of the present invention can be used in applications such as textile dying, biological dying applications that rely on high spectral strength chromophores, electronics applications, such as organic photoconductors, optical filters, and the like, color filters for liquid crystal display systems, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Dimer Dianthranilate Bis-[4-(3-methyl-5-oxo-2-pyrazolin-1-yl)benzoic acid]Diazo

Part A: Dimer Dianthranilate Bis-Diazotization

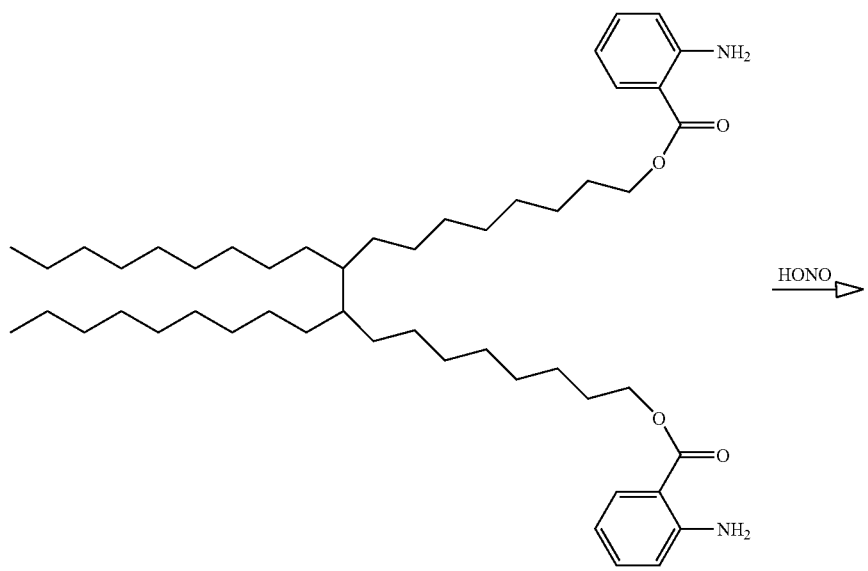

-continued

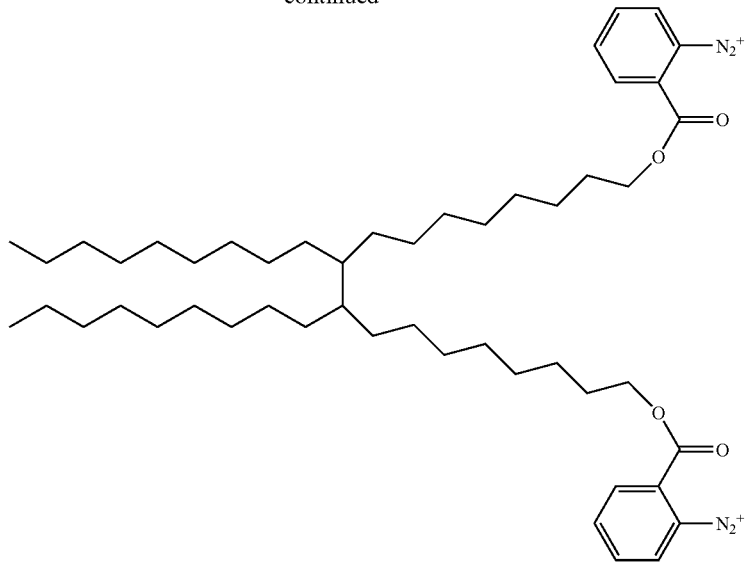

To a 500 milliliter 3-neck kettle equipped with mechanical stirrer and a thermometer was charged about 19.4 grams (MW-776) dimer ester anthranilate (DEA) precursor, the preparation of which is found in Example 1 of U.S. Pat. No. 6,713,614, the disclosure of which is hereby incorporated by reference herein in its entirety, followed sequentially with about 65 grams of glacial acetic acid, about 9.7 grams of concentrated sulfuric acid, and about 15.4 grams of deionized water. The contents were stirred until everything dissolved. The round bottle was put in an ice bath and stirred until the temperature was about 3° C. to about 5° C. To a constant pressure addition funnel was charged about 16.2 grams nitrosyl sulfuric acid (NSA, MW-127, 40%-wt in sulfuric acid). The NSA solution was added slowly into the brown DEA solution to maintain the reaction temperature between about 3° C. to about 10° C. After about 1 hour, the addition was complete and the contents were stirred for another 2 hours. During the 2 hour stir time, a phosphomolybdic acid test (PMA test) was run to insure there was an excess of $NO^+$. The result was positive. Then about 2.0 grams of sulfamic acid was added to react with excess NSA. A PMA test was run after about 15 minutes and it showed that all NSA was reacted. At this point the azo was ready to add to the coupler.

Part B: The Coupling of Dimer Dianthranilate Bis-Diazo to 4-(3-methyl-5-oxo-2-pyrazolin-1-yl)benzoic acid

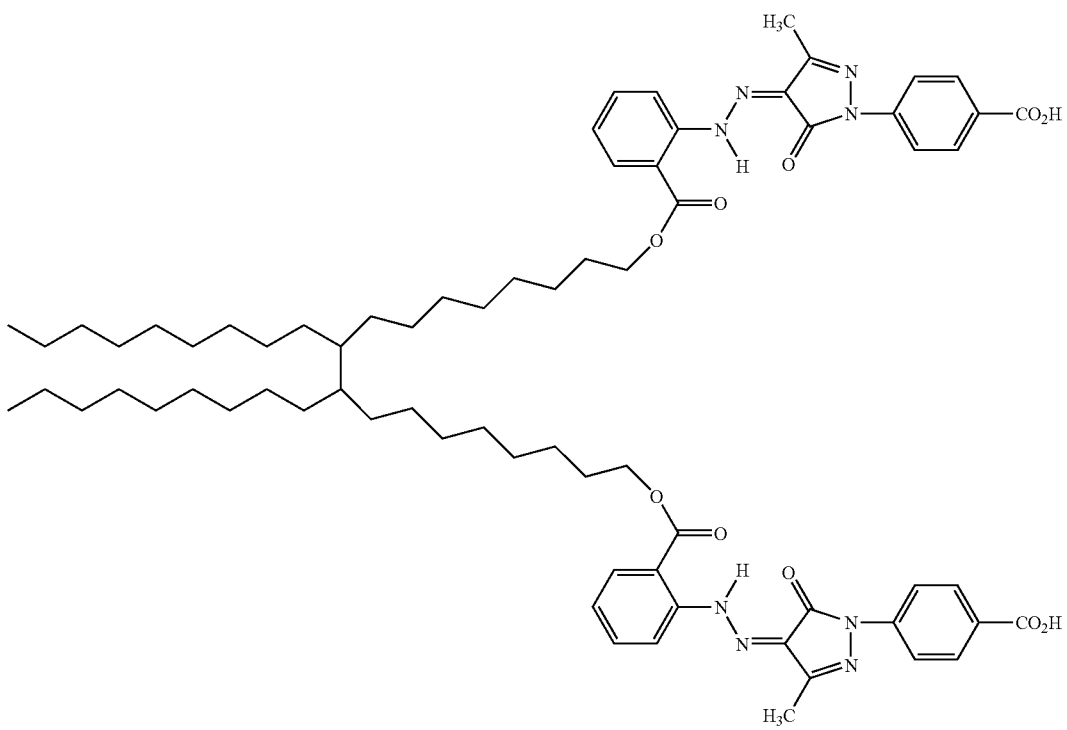

Dissolving the 4-(3-methyl-5-oxo-2-pyrazolin-1-yl)benzoic acid: To a 1 liter beaker with equipped with a magnetic stir bar was added about 162 grams of water, about 14.6 grams of sodium acetate and about 7.1 grams of NaOH and stirred until everything was dissolved. About 11.1 grams of 4-(3-methyl-5-oxo-2-pyrazolin-1-yl) benzoic acid (MW=218) was then added to the beaker. The solution remained clear.

Adding the Dimer Dianthranilate Bis-Diazo to the 4-(3-methyl-5-oxo-2-pyrazolin-1-yl) benzoic acid. The cooled contents from Example 1, Part A above were then slowly added to this solution allowing the azo coupling to take place.

A yellow solids immediately began to precipitate out of solution. The contents were allowed to stir overnight. The yellow solids were collected by filtration, reslurried in about 20 milliliters of water, and collected by filtration. The solids were allowed to air dry. The spectral strength of the yellow colorant was determined using a spectrophotometric procedure based on the measurement of the colorant in solution by dissolving the colorant in toluene and measuring the absorbance using a Perkin Elmer Lambda 2S UV/VIS spectrophotometer. The spectral strength of the colorant measured as about 37,882 mL*Absorbance Units per gram at absorption $\lambda_{max}$.

Example 2

Dimer Dianthranilate
Bis-[N-Dodecylanilinophenylpyrazolone
Carboxamide]Diazo]

Part A: Dimer Dianthranilate Bis-Diazotization

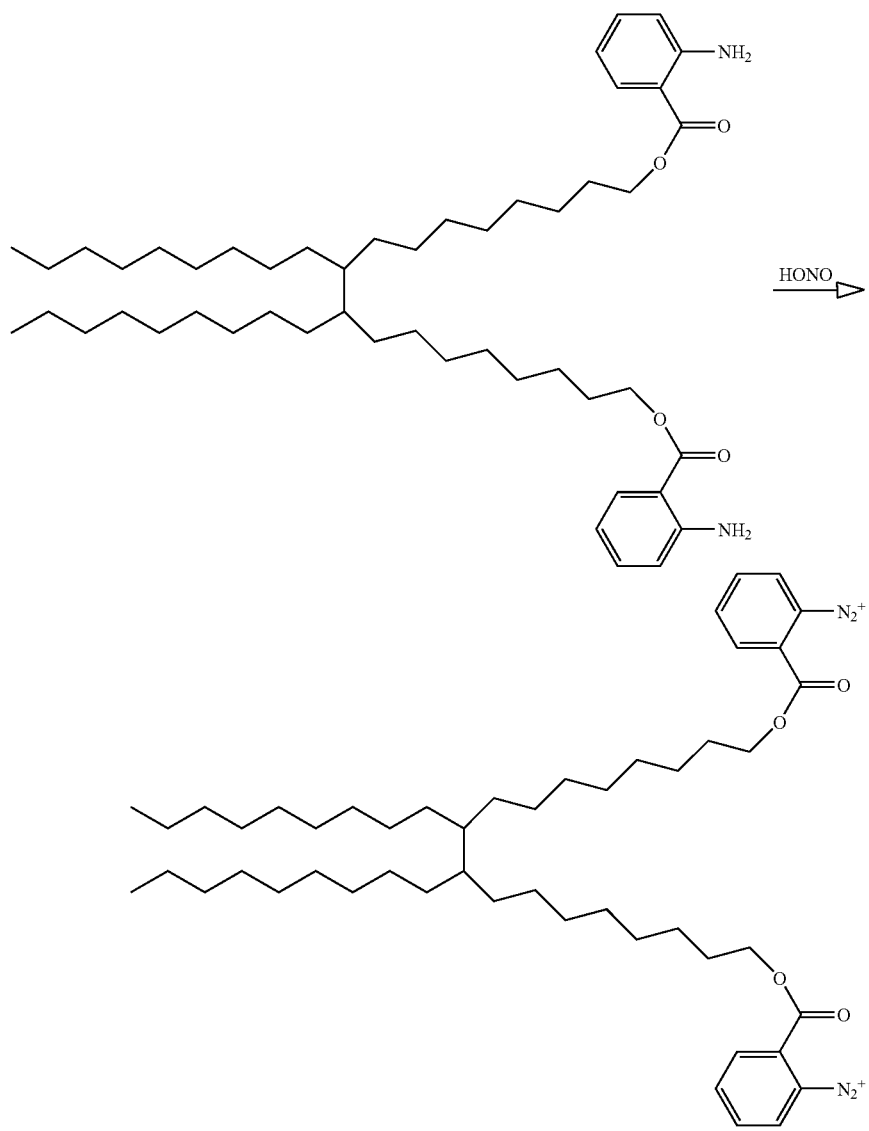

To a 1 liter 3-neck round bottom flask equipped with a mechanical stirrer and a thermometer was charged about 21.6 grams (MW=776) of dimer ester anthranilate (DEA) precursor, the preparation of which is found in Example 1 of U.S. Pat. No. 6,713,614, the disclosure of which is hereby incorporated by reference herein in its entirety, followed sequentially with about 42 milliliters of glacial acetic acid, about 3.6 milliliters of concentrated sulfuric acid, about 4.0 milliliters of deionized water and about 4.4 milliliters of propionic acid. All dissolved. The round bottom flask was placed in an ice bath and stirred until the temperature was about 3° C. to about 5° C. To a constant pressure addition funnel was charged about 11.2 milliliters (0.057 moles) of nitrosyl sulfuric acid (NSA, MW=127, 40%-wt in sulfuric acid). The NSA solution was added slowly into the brown DEA solution to maintain the reaction temperature between about 3° C. to about 10° C. After about 2 hours the addition was complete and the contents were stirred for another half hour. A phosphomolybdic acid test (PMA test) was run to check if the reaction completed. The result was negative which suggested the reaction had not completed and more NSA was needed. About 1.0 gram of additional NSA was added. After about 5 minutes another PMA test was run and the result was still negative. About 0.4 gram of NSA was added. After about 15 minutes, the reaction was again checked with a PMA test and the result was negative. Another about 0.4 gram of NSA was added and the reaction was checked with a PMA test. This time the result was positive. The reaction mixture was allowed to stir at about 3° C. to about 5° C. for about 2 hours. Then about 0.6 gram sulfamic acid was added to react with excess NSA. A PMA test was run after about 15 minutes and it showed that all NSA was reacted. At this point the azo was ready to add to the coupler.

Part B: The Synthesis of
N-Dodecylanilinophenylpyrazolone Carboxamide

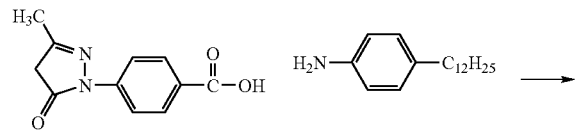

-continued

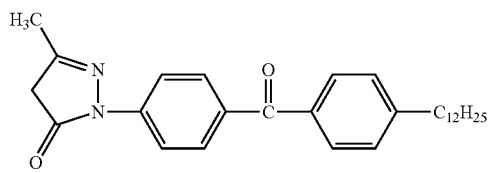

To a 500 milliliter 1-neck round between flask with equipped with a Teflon® coated stir magnet, condenser and 165° C. oil bath was added about 14.5 grams of 4-(3-methyl-5-oxo-2-pyrazolin-1-yl) benzoic acid, about 17.4 grams of dodecylaniline (available from EMF Dottikon), about 9.2 grams of $PCl_3$, and about 165 grams of toluene. The reaction mixture was refluxed with stirring at 165° C. for about 21 hours at which time the condenser was removed and a vacuum distillation setup was assembled and the toluene and $POCl_3$ were distilled off leaving a solid product. The crude solid product was transferred to a 600 milliliter beaker and recrystallized in about 275 milliliters of ethanol. The solids were collected by filtration and used without further purification.

Part C: The Coupling of Dimer Dianthranilate
Bis-Diazo to N-Dodecylanilinophenylpyrazolone
Carboxamide

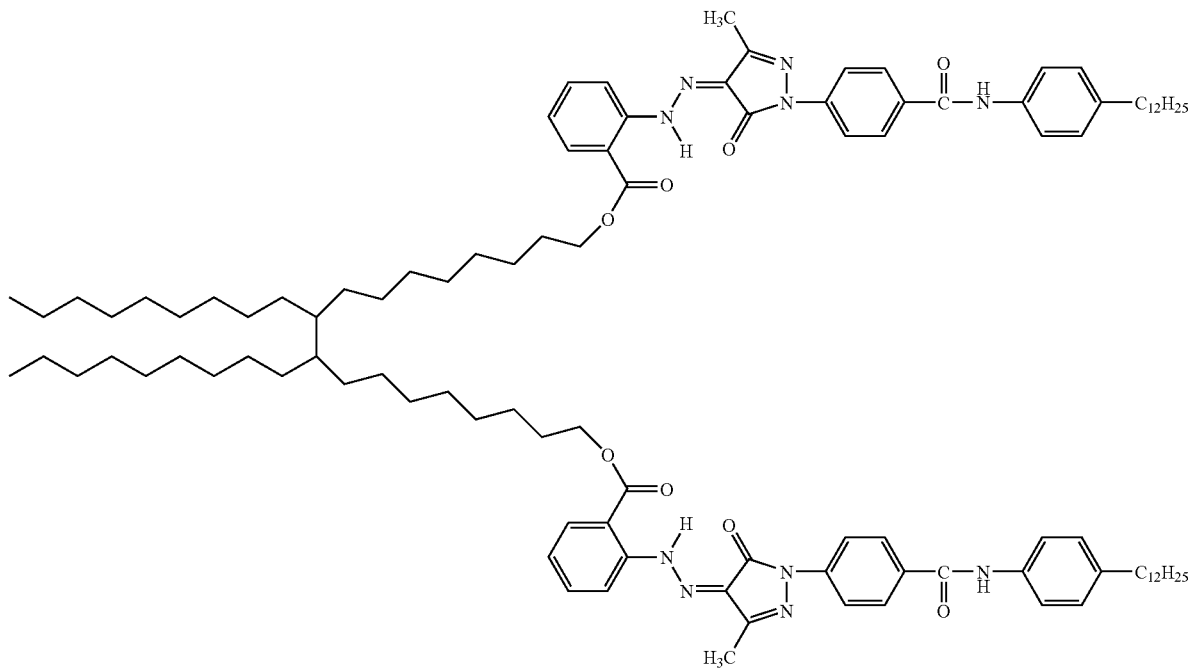

Dissolving the N-Dodecylanilinophenylpyrazolone Carboxamide: To a 2 liter beaker with equipped with a magnetic stir bar was charged about 700 grams of deionized water, about 16.0 grams of acetic acid, and about 22.2 grams of NaOH. The contents were stirred until completely dissolved. About 700 milliliters of isopropyl alcohol and about 25.2 grams of N-dodecylanilinophenylpyrazolone carboxamide from Example 2, Part B was then added and stirred until all was dissolved.

Adding the Dimer Dianthranilate Bis-Diazo to the Dissolved N-dodecylanilinophenylpyrazolone carboxamide: The cooled contents from Example 2, Part A were added to the beaker containing the N-dodecylanilinophenylpyrazolone carboxamide solution. A yellow precipitate formed at the beginning of coupling then the solids turned into a very viscous liquid. After stirring for one hour the contents were allowed to settle over night. The top liquid was decanted. The bottom viscous liquid contained white salt and yellow product. About 700 milliliters of deionized water was added to the solids and stirred for about one hour. The aqueous later was then discarded. The bottom yellow viscous liquid product was dissolved in 700 milliliters of toluene and washed with water in a separatory funnel. The lower water layer was discarded and top toluene layer was run through a silica plug. Then the toluene was evaporated yielding a viscous very dark yellow dye. The spectral strength of the yellow colorant was determined using a spectrophotometric procedure based on the measurement of the colorant in solution by dissolving the colorant in toluene and measuring the absorbance using a Perkin Elmer Lambda 2S UV/VIS spectrophotometer. The spectral strength of the colorant measured in toluene as about 9,071 mL*Absorbance Units per gram at absorption $\lambda_{max}$.

Example 3

Menthyl Anthranilate
3-methyl-1-phenyl-2-pyrazoline-5-one Diazo

Part A: Menthyl Anthranilate Diazotization

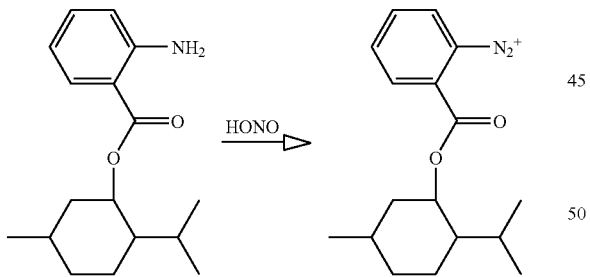

To a 150 milliliter 3-neck round bottom flask equipped with a mechanical stirrer, salt/ice bath, and thermometer was charged about 11.9 grams of menthyl anthranilate (MW=275), about 29.7 grams of acetic acid, about 5.9 grams of water and about 1.5 grams of concentrated sulfuric acid. The contents were stirred until dissolved while keeping the temperature of the ice bath at about 0° C. About 16.5 grams of nitrosyl sulfuric acid (NSA MW=127, 40% wt) was slowly through an addition funnel maintaining the reaction temperature below 3° C. The addition took about 32 minutes. The cooled reaction mixture was stirred an additional two hours. A PMA test (to determine excess NO+) was run and the result was positive indicating the reaction was complete. About 1.8 grams of sulfamic acid was added (to kill excess NSA) and stirred for 20 minutes. A PMA test confirmed that all excess NSA had been killed. At this point the reaction mixture is ready to couple.

Part B: The Coupling of Menthyl Anthranilate Diazo to 3-methyl-1-phenyl-2-pyrazoline-5-one

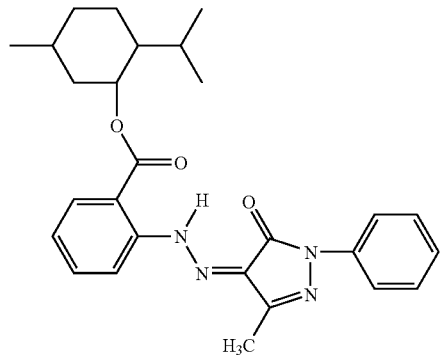

Dissolving the 3-methyl-1-phenyl-2-pyrazoline-5-one: To a 1 liter beaker with equipped with a magnetic stir bar was added about 100 grams of water, about 16 grams of acetic acid and about 22 grams of NaOH and stirred until everything was dissolved. About 7.5 grams of 3-methyl-1-phenyl-2-pyrazoline-5-one (MW=174) was then added to the beaker. The solution remained clear.

Adding the Menthyl Anthranilate Diazo to the Dissolved 2-Ethylhexylacetoacetamide: The cooled contents from Example 3, Part A were then slowly added to this solution allowing the azo coupling to take place. A yellow solids immediately began to precipitate out of solution. Additional water was added (about 200 grams) to aid in stirring efficiency. The contents were allowed to stir overnight. The yellow solids were collected by filtration, reslurried in about 200 ml of water, and collected by filtration. The solids were allowed to air dry. The spectral strength of the yellow colorant was determined using a spectrophotometric procedure based on the measurement of the colorant in solution by dissolving the colorant in toluene and measuring the absorbance using a Perkin Elmer Lambda 2S UV/VIS spectrophotometer. The spectral strength of the colorant measured in toluene as about 44,992 mL*Absorbance Units per gram at absorption $\lambda_{max}$.

Example 4

The Coupling of Menthyl Anthranilate Diazo to N-Dodecylanilinophenylpyrazolone Carboxamide

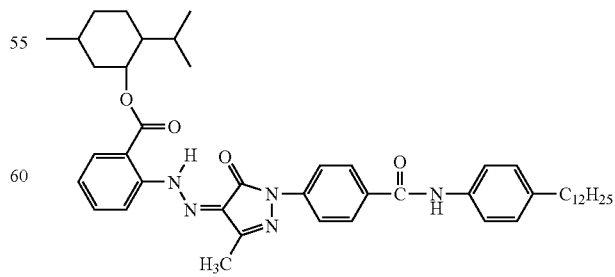

Dissolving the N-dodecylanilinophenylpyrazolone carboxamide: To a 4 liter beaker with equipped with a magnetic stir bar was added about 200 grams of water, about 32 grams of acetic acid, about 44 grams of NaOH, and about 1200 grams of methanol with stirring until everything was dissolved. About 20.0 grams of N-dodecylanilinophenylpyrazolone carboxamide from Example 2, Part B above was then added to the beaker. A precipitate formed. About 400 additional grams of water and about 1200 milliliters of isopropyl alcohol were added to bring all of the contents into solution.

Adding the Menthyl Anthranilate Diazo to the Dissolved 2-ethylhexylacetoacetamide: The cooled contents from Example 3, Part A above were then slowly added to this solution allowing the azo coupling to take place. An orange solids immediately began to precipitate out of solution. The contents were allowed to stir overnight. The orange solids were collected by filtration, reslurried in about 200 milliliters of water, and collected by filtration. The solids were allowed to air dry. The spectral strength of the yellow colorant was determined using a spectrophotometric procedure based on the measurement of the colorant in solution by dissolving the colorant in toluene and measuring the absorbance using a Perkin Elmer Lambda 2S UV/VIS spectrophotometer. The spectral strength of the colorant measured in toluene as about 32,703 mL*Absorbance Units per gram at absorption $\lambda_{max}$.

Example 5

Preparation of an Ink Base

An ink base was prepared by melting, admixing, and filtering the following ingredients:

43.59 parts by weight polyethylene wax (PH 655®, obtained from Baker Petrolite) of the formula $CH_3(CH_2)_{50}CH_3$);

19.08 parts by weight stearyl stearamide wax (KEMAMIDE® S-180, obtained from Crompton Corporation);

18.94 parts by weight tetra-amide resin obtained from the reaction of one equivalent of a C-36 dimer acid (obtained from Uniqema, New Castle, Del.) with two equivalents of ethylene diamine and UNICID® 700 (obtained from Baker Petrolite), a long chain hydrocarbon having a terminal carboxylic acid group, prepared as described in Example 1 of U.S. Pat. No. 6,174,937, which is hereby incorporated by reference herein in its entirety;

11.71 parts by weight urethane resin obtained from the reaction of two equivalents of ABITOL® E hydroabietyl alcohol (obtained from Hercules Inc.) and one equivalent of isophorone diisocyanate, prepared as described in Example 1 of U.S. Pat. No. 5,782,966, which is hereby incorporated by reference herein;

6.48 parts by weight urethane resin that is the adduct of three equivalents of stearyl isocyanate and a glycerol-based alcohol, prepared as described in Example 4 of U.S. Pat. No. 6,309,453, which is hereby incorporated by reference herein in its entirety;

0.20 parts by weight NAUGUARD® 445 antioxidant (obtained from Uniroyal Chemical Co.).

Thereafter, 600 grams of the ink carrier components as listed above in the percentages as listed above were added to a 1 liter beaker and heated in an oven at 135° C. until molten. Subsequently, the beaker was inserted into a heating mantle set to 135° C. and the contents of the beaker were stirred for 45 minutes. The resulting ink was then filtered through a combination of Whatman #3 and 0.2 micron NAF filters and placed in a Mott filter assembly. Filtration was supported by the addition of 1 percent by weight FILTER-AID obtained from Fluka Chemika, and proceeded at a temperature of 135° C. until complete after 6 hours. The ink base was poured into molds containing about 31 grams of the colorless ink base and allowed to cool.

Example 6

Preparation of Ink Containing Colorant

About 30.2 grams of ink base from Example 5 was placed in a 100 milliliter beaker equipped with a magnetic stir bar and subsequently placed in a 135° C. oil bath until molten. About 1.26 grams of the dye from Example 1, Part B was then added and stirred for about 1 hour. The yellow colored ink was then poured into an aluminum mold.

Example 7

About 30.4 grams of ink base from Example 5 was placed in a 100 milliliter beaker equipped with a magnetic stir bar and subsequently placed in a 135° C. oil bath until molten. About 0.66 grams of the dye from Example 3, Part B was then added and stirred for about 1 hour. The yellow colored ink was then poured into an aluminum mold.

Example 8

About 28.2 grams of ink base from Example 5 was placed in a 100 milliliter beaker equipped with a magnetic stir bar and subsequently placed in a 135° C. oil bath until molten. About 0.68 grams of the dye from Example 4 was then added and stirred for about 1 hour. The yellow colored ink was then poured into an aluminum mold.

Example 9

Printing of Ink Samples Containing Colorant

Printed samples of the ink prepared in Examples 6, 7, and 8 were generated on HAMMERMILL LASERPRINT® paper using a K Printing Proofer (manufactured by RK Print Coat Instrument Ltd., Litlington, Royston, Heris, SG8 0OZ, U.K.). In this method, the tested inks were melted onto a printing plate set at 150° C. temperature. A roller bar fitted with the paper was then rolled over the plate containing the melted ink on its surface. The ink on the paper was cooled, resulting in three separated images of rectangular blocks. The most intensely colored block contained the most ink deposited on the paper, and was therefore used to obtain the color value measurements. The printed samples were evaluated visually.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A compound of the formula

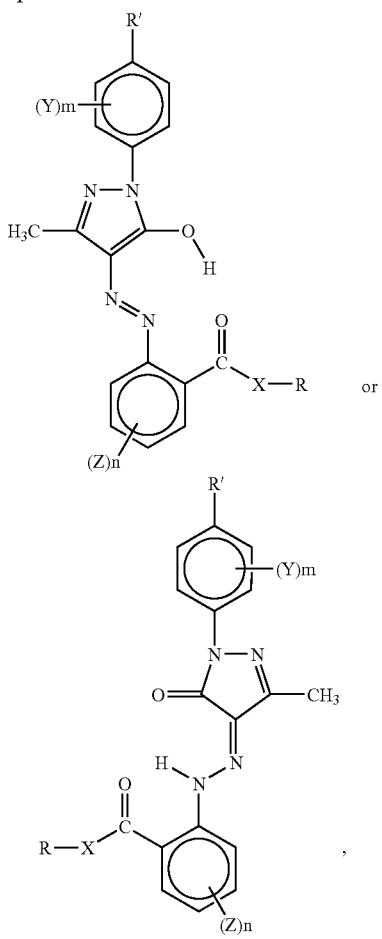

wherein R is

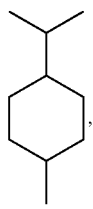

and R' is selected from (i) an unsubstituted, substituted, linear, branched, cyclic, saturated, or unsaturated alkyl group of at least 12 carbon atoms, and wherein hetero atoms either may or may not be present in the alkyl group, (ii) a group of the formula

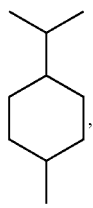

or (iii) hydrogen;
wherein X is a (i) direct bond, or (ii) an oxygen atom;
wherein $(Y)_m$ and $(Z)_n$ are each independently optionally present and where $(Y)_m$ and $(Z)_n$ are each independently selected from i) a hydrogen atom, (ii) a halogen atom, (iii) a nitro group, (iv) a substituted or unsubstituted alkyl group, wherein hetero atoms either may or may not be present in the alkyl group, (v) a substituted or unsubstituted aryl group, wherein hetero atoms either may or may not be present in the aryl group, (vi) a substituted or unsubstituted arylalkyl group, wherein hetero atoms either may or may not be present in the arylalkyl group, (vii) a substituted or unsubstituted alkylaryl group, wherein hetero atoms either may or may not be present in the alkylaryl group, (viii) a group of the formula

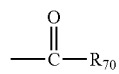

wherein $R_{70}$ is a substituted or unsubstituted alkyl group, wherein hetero atoms either may or may not be present in the alkyl group, a substituted or unsubstituted aryl group, wherein hetero atoms either may or may not be present in the aryl group, a substituted or unsubstituted arylalkyl group, wherein hetero atoms either may or may not be present in the arylalkyl group, a substituted or unsubstituted alkylaryl group, wherein hetero atoms either may or may not be present in the alkylaryl group, a substituted or unsubstituted alkoxy group, wherein additional hetero atoms either may or may not be present in the alkoxy group, a substituted or unsubstituted aryloxy group, wherein additional hetero atoms either may or may not be present in the aryloxy group, a substituted or unsubstituted arylalkyloxy group, wherein additional hetero atoms either may or may not be present in the arylalkyloxy group, a substituted or unsubstituted alkylaryloxy group, wherein additional hetero atoms either may or may not be present in the alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, (ix) a sulfonyl group of the formula —$SO_2R_{80}$ wherein $R_{80}$ is a hydrogen atom, a substituted or unsubstituted alkyl group, wherein hetero atoms either may or may not be present in the alkyl group, a substituted or unsubstituted aryl group, wherein hetero atoms either may or may not be present in the aryl group, a substituted or unsubstituted arylalkyl group, wherein hetero atoms either may or may not be present in the arylalkyl group, a substituted or unsubstituted alkylaryl group, wherein hetero atoms either may or may not be present in the alkylaryl group, a substituted or unsubstituted alkoxy group, wherein additional hetero atoms either may or may not be present in the alkoxy group, a substituted or unsubstituted aryloxy group, wherein additional hetero atoms either may or may not be present in the aryloxy group, a substituted or unsubstituted arylalkyloxy group, wherein additional hetero atoms either may or may not be present in the arylalkyloxy group, a substituted or unsubstituted alkylaryloxy group, wherein additional hetero atoms either may or may not be present in the alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, or (x) a phosphoryl group of the formula —$PO_3R_{90}$ wherein $R_{90}$ is a hydrogen atom, a substituted or unsubstituted alkyl group, wherein hetero atoms either may or may not be present in the alkyl group, a substituted or unsubstituted aryl group, wherein hetero atoms either may or may not be present in the aryl group, a substituted or unsubstituted arylalkyl group, wherein hetero atoms either may or may not be present in the arylalkyl group, a substituted or unsubstituted alkylaryl group, wherein hetero atoms either may or may not be present in the alkylaryl group, a substituted or unsubstituted alkoxy group, wherein additional hetero atoms either may or may not be present in the alkoxy group, a substituted or unsubstituted aryloxy group, wherein additional hetero atoms either may or may not be present in the aryloxy group, a substituted or unsubstituted arylalkyloxy group, wherein additional hetero atoms either may or may not be present in the arylalkyloxy group, a substituted or unsubstituted alkylaryloxy group, wherein additional hetero atoms either may or may not be present in the alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group; and wherein in (Y)m, m is an integer from 0 to 4, and in (Z)n, n is an integer from 0 to 4.

2. A compound according to claim 1, wherein R' is a linear alkyl group.

3. A compound according to claim 1, wherein R' is a branched alkyl group.

4. A compound according to claim 1, wherein R' is a saturated alkyl group.

5. A compound according to claim 1, wherein R' is an unsaturated alkyl group.

6. A compound according to claim 1, R' is an unsubstituted alkyl group.

7. A compound according to claim 1, R' is a substituted alkyl group.

8. A compound according to claim 1, R' is an alkyl group wherein hetero atoms selected from oxygen, nitrogen, sulfur, silicon, phosphorus, boron, or mixtures thereof, are present in the alkyl group.

9. A compound according to claim 1, R' is an alkyl group wherein no hetero atoms are present in the alkyl group.

10. A compound of the formula

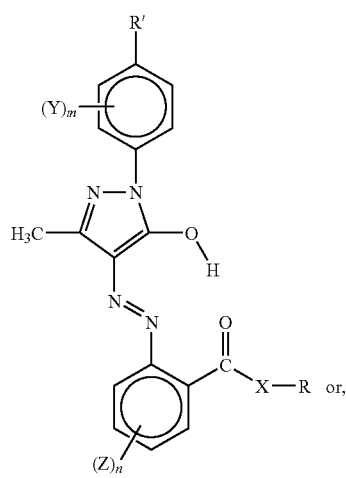

-continued

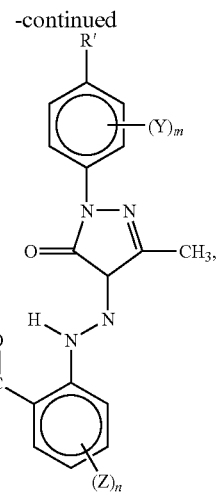

wherein R is

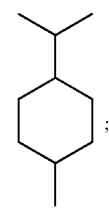

R' is selected from (i) a substituted or unsubstituted alkyl group having 4 to 12 carbon atoms, wherein hetero atoms either may or may not be present in the alkyl group, (ii) a heterocyclic group, (iii) a siloxane group, (iv) a polysiloxane group, or (v) hydrogen;

wherein X is a (i) direct bond, or (ii) an oxygen atom;

wherein $(Y)_m$ and $(Z)_n$ are each independently optionally present and where $(Y)_m$ and $(Z)_n$ are each independently selected from i) a hydrogen atom, (ii) a halogen atom, (iii) a nitro group, (iv) a substituted or unsubstituted alkyl group, wherein hetero atoms either may or may not be present in the alkyl group, (v) a substituted or unsubstituted aryl group, wherein hetero atoms either may or may not be present in the aryl group, (vi) a substituted or unsubstituted arylalkyl group, wherein hetero atoms either may or may not be present in the arylalkyl group, (vii) a substituted or unsubstituted alkylaryl group, wherein hetero atoms either may or may not be present in the alkylaryl group, (viii) a group of the formula

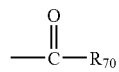

wherein $R_{70}$ is a substituted or unsubstituted alkyl group, wherein hetero atoms either may or may not be present in the alkyl group, a substituted or unsubstituted aryl group, wherein hetero atoms either may or may not be present in the aryl group, a substituted or unsubstituted arylalkyl group, wherein hetero atoms either may or may not be present in the arylalkyl group, a substituted or unsubstituted alkylaryl group, wherein hetero atoms either may or may not be present in the alkylaryl group, a substituted or unsubstituted alkoxy group, wherein additional hetero atoms either may or may not be present in the alkoxy group, a substituted or unsubstituted aryloxy group, wherein additional hetero atoms either may or may not be present in the aryloxy group, a substituted or unsubstituted arylalkyloxy group, wherein additional hetero atoms either may or may not be present in the arylalkyloxy group, a substituted or unsubstituted alkylaryloxy group, wherein additional hetero atoms either may or may not be present in the alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, (ix) a sulfonyl group of the formula —$SO_2R_{80}$ wherein $R_{80}$ is a hydrogen atom, a substituted or unsubstituted alkyl group, wherein hetero atoms either may or may not be present in the alkyl group, a substituted or unsubstituted aryl group, wherein hetero atoms either may or may not be present in the aryl group, a substituted or unsubstituted arylalkyl group, wherein hetero atoms either may or may not be present in the arylalkyl group, a substituted or unsubstituted alkylaryl group, wherein hetero atoms either may or may not be present in the alkylaryl group, a substituted or unsubstituted alkoxy group, wherein additional hetero atoms either may or may not be present in the alkoxy group, a substituted or unsubstituted aryloxy group, wherein additional hetero atoms either may or may not be present in the aryloxy group, a substituted or unsubstituted arylalkyloxy group, wherein additional hetero atoms either may or may not be present in the arylalkyloxy group, a substituted or unsubstituted alkylaryloxy group, wherein additional hetero atoms either may or may not be present in the alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, or (x) a phosphoryl group of the formula —$PO_3R_{90}$ wherein $R_{90}$ is a hydrogen atom, a substituted or unsubstituted alkyl group, wherein hetero atoms either may or may not be present in the alkyl group, a substituted or unsubstituted aryl group, wherein hetero atoms either may or may not be present in the aryl group, a substituted or unsubstituted arylalkyl group, wherein hetero atoms either may or may not be present in the arylalkyl group, a substituted or unsubstituted alkylaryl group, wherein hetero atoms either may or may not be present in the alkylaryl group, a substituted or unsubstituted alkoxy group, wherein additional hetero atoms either may or may not be present in the alkoxy group, a substituted or unsubstituted aryloxy group, wherein additional hetero atoms either may or may not be present in the aryloxy group, a substituted or unsubstituted arylalkyloxy group, wherein additional hetero atoms either may or may not be present in the arylalkyloxy group, a substituted or unsubstituted alkylaryloxy group, wherein additional hetero atoms either may or may not be present in the alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group; and wherein in (Y)m, m is an integer from 0 to 4, and in (Z)n, n is an integer from 0 to 4.

11. A compound of the formula

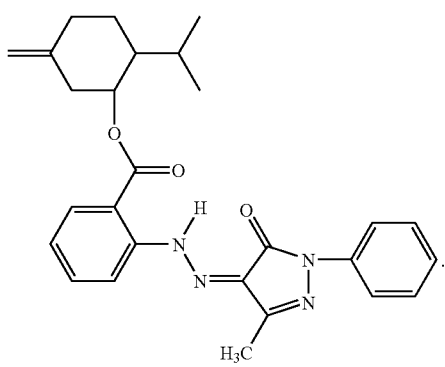

12. A compound of the formula

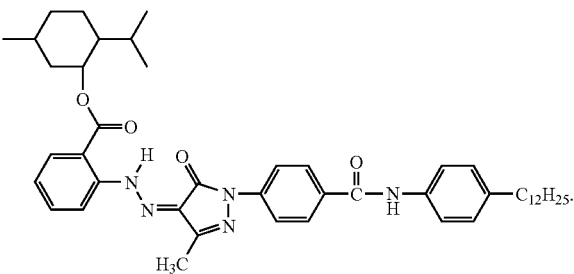

* * * * *